United States Patent
Ebadi et al.

(10) Patent No.: US 11,165,490 B2
(45) Date of Patent: Nov. 2, 2021

(54) BEAMSCANNING MODULAR AND SCALABLE SATELLITE USER TERMINALS

(71) Applicant: UTVATE Corporation, San Francisco, CA (US)

(72) Inventors: Siamak Ebadi, San Francisco, CA (US); Stefan William Turkowski, Oakland, CA (US); Andres Felipe Osorio, Emeryville, CA (US); Amin Reda, Oakland, CA (US)

(73) Assignee: UTVATE Corporation, San Francisco, CA (US)

( * ) Notice: Subject to any disclaimer, the term of this patent is extended or adjusted under 35 U.S.C. 154(b) by 0 days.

(21) Appl. No.: 17/085,412

(22) Filed: Oct. 30, 2020

(65) Prior Publication Data
US 2021/0226693 A1    Jul. 22, 2021

Related U.S. Application Data

(60) Provisional application No. 62/964,376, filed on Jan. 22, 2020, provisional application No. 63/019,228, filed on May 1, 2020.

(51) Int. Cl.
*H04B 7/185*    (2006.01)
*H04B 7/06*    (2006.01)
(Continued)

(52) U.S. Cl.
CPC ....... *H04B 7/18517* (2013.01); *H04B 7/0617* (2013.01); *H04B 7/18513* (2013.01); *H04B 7/19* (2013.01); *H04B 7/195* (2013.01)

(58) Field of Classification Search
CPC .... H04B 7/06; H04B 7/0617; H04B 7/18513; H04B 7/18517; H04B 7/19; H04B 7/195;
(Continued)

(56) References Cited

U.S. PATENT DOCUMENTS 6,640,111 B1 * 10/2003 Shapira ............... H01Q 1/246
                                                        455/562.1
7,394,424 B1 *  7/2008 Jelinek ............... H01Q 3/2682
                                                        342/375
(Continued)

FOREIGN PATENT DOCUMENTS

EP           3281032 B1    12/2019

OTHER PUBLICATIONS

U.S. Appl. No. 16/858,691, filed Apr. 26, 2020 "Antenna Modules in Phase Array Antennas."
(Continued)

*Primary Examiner* — Yuwen Pan
*Assistant Examiner* — Paul P Tran
(74) *Attorney, Agent, or Firm* — Cognition IP, P.C.; Edward Steakley

(57) ABSTRACT

Disclosed embodiments relate to modular antenna systems. In one example, an antenna system includes M user terminal elements, each being application-agnostic and including an antenna either to generate an incoming signal in response to incident satellite radio waves or to transmit an outgoing signal, and an active circuit to process the incoming and outgoing signals, a control circuit to control the processing performed by the M active circuits, and N user terminal modules (UTM) each including a daisy-chain of O of the M active circuits, each UTM further including a buffer placed after every P active circuits in order to correct any degradation that has occurred in the daisy-chain, and wherein M can be adjusted so that an antenna area and a corresponding throughput and bandwidth available to an application are adjustable and scalable.

9 Claims, 29 Drawing Sheets

(51) Int. Cl.
*H04B 7/19* (2006.01)
*H04B 7/195* (2006.01)

(58) Field of Classification Search
CPC .. H04B 7/2041; H04L 27/0002; H04W 56/00; H04W 56/001; H01Q 21/0006; H01Q 3/26; H01Q 3/29
See application file for complete search history.

(56) References Cited

U.S. PATENT DOCUMENTS

| | | | |
|---|---|---|---|
| 7,769,108 B1* | 8/2010 | Tsui | H04L 27/0002 375/316 |
| 9,391,684 B1* | 7/2016 | Marr | H04B 7/0617 |
| 10,483,653 B2* | 11/2019 | Zihir | H01Q 21/0025 |
| 2009/0231197 A1* | 9/2009 | Richards | H01Q 3/2605 342/377 |
| 2010/0099370 A1 | 4/2010 | Nichols et al. | |
| 2016/0087339 A1 | 3/2016 | Bull et al. | |
| 2016/0127014 A1 | 5/2016 | Wloczysiak | |
| 2018/0041270 A1* | 2/2018 | Buer | H04B 7/2041 |
| 2019/0115791 A1 | 4/2019 | Zeine et al. | |
| 2019/0252796 A1 | 8/2019 | Mahanfar et al. | |
| 2020/0106582 A1* | 4/2020 | Jalali | H04L 5/0048 |

OTHER PUBLICATIONS

International Search Report in PCT International Application No. PCT/US2021/014025, dated Mar. 31, 2021.

\* cited by examiner

BEAMSCANNING MODULAR AND SCALABLE SATELLITE USER TERMINALS

CROSS-REFERENCE TO RELATED APPLICATIONS

This application claims the benefit of U.S. Provisional Application No. 62/964,376, filed Jan. 22, 2020, which is hereby incorporated by reference in its entirety.

This application further claims the benefit of U.S. Provisional Application No. 63/019,228, filed May 1, 2020, which is hereby incorporated by reference in its entirety.

TECHNICAL FIELD

Aspects of the disclosure are related to the field of beamscanning antenna array systems and solutions, and in particular, to inexpensive, reusable, and interchangeable antenna elements that are combinable into modular electronically scanned array antenna systems for high-performance beamscanning applications.

BACKGROUND

Today, over half of the world's population, mostly in developing countries, do not have access to the Internet. Indeed, more than four billion people are missing out on the life-changing benefits of connectivity, from financial services to health and education, being brought about by the increasing pace of innovation known as the Fourth Industrial Revolution. Governments, companies, local and international organizations, and members of civil society are working to get more people online. Unfortunately, the problem is exceedingly large, complex, and multidimensional. For example, infrastructure and equipment enabling connectivity is simply not available or affordable in many places around the world.

SUMMARY

One or more embodiments described herein, among other benefits, solve one or more of the foregoing or other problems in the art by providing systems, apparatuses, and methods for providing inexpensive and reusable (or interchangeable) antenna elements combinable into high-performance modular electronically scanned array antenna systems that are configurable for various commercial and consumer beamscanning communication applications.

In one embodiment, a satellite antenna system includes M application-agnostic user terminal elements (UTE), each including an antenna either to generate an incoming signal in response to incident satellite radio waves or to transmit an outgoing signal toward a receiver, such as a satellite or a ground unit. Each UTE further includes active circuitry to process the incoming and outgoing signals. The UTE active circuits are controlled by control circuitry, which controls the processing performed by the M active circuits. In some embodiments, the M UTEs are distributed among N user terminal modules (UTM), which each include a daisy-chain of O of the M active circuits.

To address the potential quality degradation and signal attenuation that can arise along the stages of the daisy-chain, each UTM further includes a buffer placed after every P active circuits, in order to correct any degradation that has occurred in the daisy-chain. As used herein, signal degradations corrected by the buffer include degradations in voltage due to limited drive current, and reflections due to long transmission lines.

An example of such a system is illustrated and described with respect to FIG. 5, showing a satellite antenna system in which M equals 256, and N and O equal 16. Exemplary UTMs are illustrated in FIGS. 7 and 8, showing modules having N and O equal to sixteen.

An advantage of such a system, as disclosed herein, is that because of its modular design, N can be adjusted to adjust a total antenna area and a corresponding signal throughput for a given application. For example, for a satellite antenna system intended for use in an automobile application, M can be set to a lower number than it would be in a more demanding application, such as a bus, an airplane, or a cruise ship. NRE costs are minimized in such systems insofar as the UTEs have been designed in the past and are being reused.

Additional features and advantages of the present application will be set forth in the description which follows, and in part will be obvious from the description, or may be learned by the practice of such example embodiments

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

Figure 1:
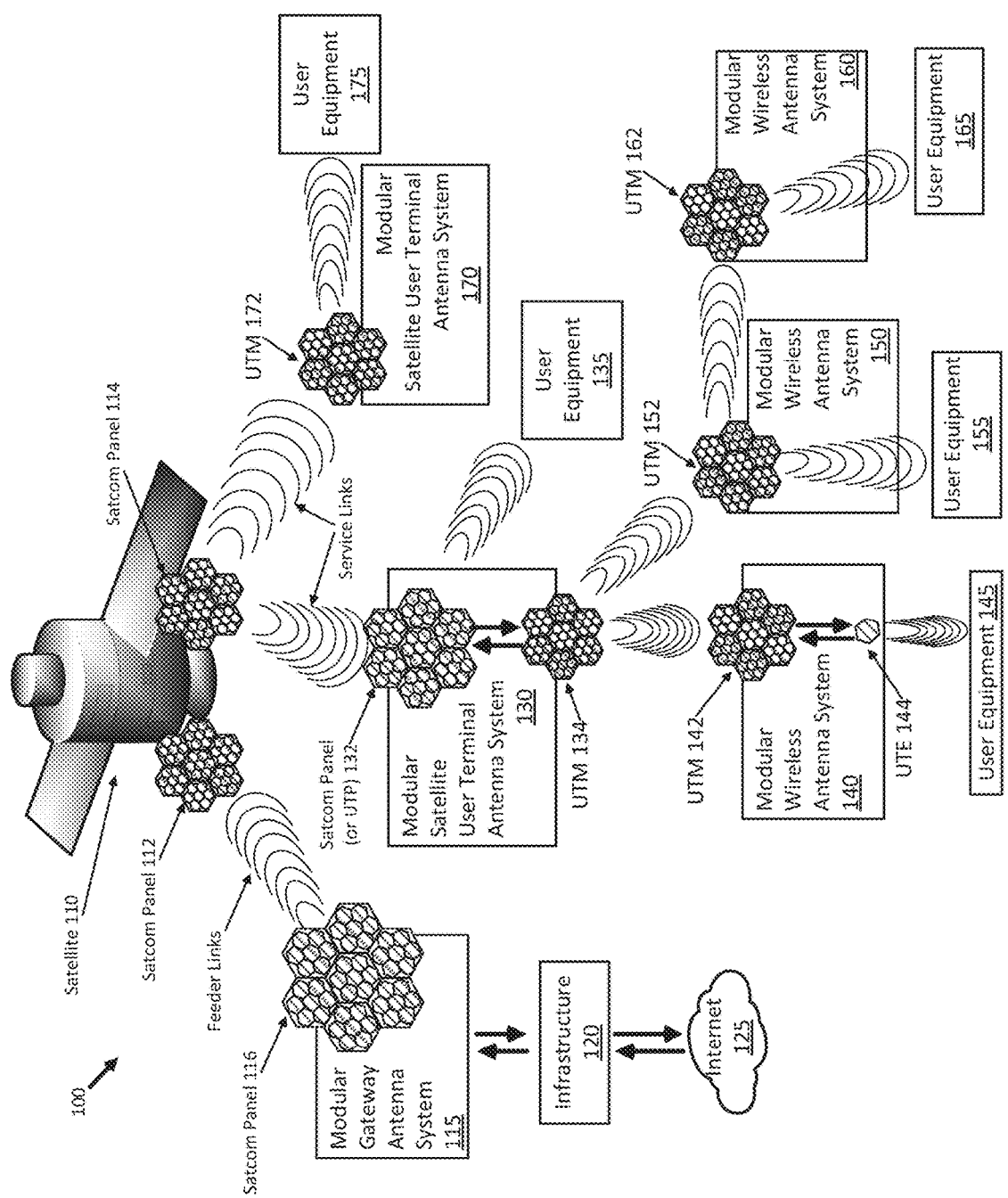
FIG. 1 depicts a block diagram illustrating a general overview and architecture of an example satellite communication system including various modular antenna array systems, according to some implementations.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may include systems, processes, apparatuses, machine-implemented methods, computing devices, or computer readable medium.

As discussed above, infrastructure and equipment enabling connectivity is simply not available or affordable in many places around the world. For example, wireless technologies, and specifically satellite communication enabling infrastructure and equipment, regularly utilize high-performance scanned array antenna systems to enable high-performance connectivity. These high-performance scanned array antenna systems utilize expensive, custom-made, phased-array antennas that are constructed using multiple antenna elements. Each antenna element typically includes a radiator (or antenna) and active circuitry. The active circuitry is traditionally embodied in a die (e.g., a Silicon die) and packaged individually and separately from a radiator (or antenna). Depending on the design, coupling the radiator (or antenna) and the active circuitry requires at least two and, often, three or more lossy radio frequency (RF) transitions. When stacked on top of each other, these lossy RF transitions result in signal degradation of up to half of the total signal power, e.g., up to three decibels (dB).

In a satellite communication terminal, the RF signal travels through the air and is transmitted or received by the UTP. The analog signal is transduced by the UTEs, and is the input or output of the UTP. The digital signals are used to alter the analog signals passing through the UTEs.

A corporate feeding network is used to combine or split the RF signal among the UTEs. In a corporate feeding, the power is split equally at each junction for uniform distribution of the signal in either transmit or receive mode. The corporate feeding network may have components for combining or splitting the signal at the UTM level and UTP level.

Because signals received from distant satellites are often very weak, the phased-array antennas for satellite communication terminal applications typically require thousands of antenna elements to receive, amplify and combine analog outputs to, at least in part, account for the RF losses that occur prior to the amplification of the analog signals. These thousands of antenna elements increase the complexity and cost of the phased-array antennas. Plus, high non-recurring engineering (NRE) costs are incurred to custom-design a system for each application. For example, the antenna elements are typically assembled on an expensive, multi-layer base board that is configured to handle RF signals. These layers can be multiple centimeters (cm) thick (e.g., 2-3 cm) and up to one meter (m) or more in length and/or width. The layers can include, for example, digital routing, RF power dividing, etc.

The limited availability and affordability of satellite ground antenna systems is further exacerbated by the way they are manufactured. Conventional antenna systems are custom designed for particular applications. Such custom-designed projects typically require extensive one-time engineering effort, which are NRE costs. Such antenna systems are also typically produced in relatively small volumes, resulting in high costs per unit. An example of such a satellite internet system available today is made by Gogo LLC, of Chicago, Ill., who provides satellite internet systems for use on airplanes. Antenna systems from Gogo LLC can cost hundreds of thousands of dollars, which in today's dollars is tantamount to the price of a house.

In contrast, the technology described herein is directed to antenna elements for modular antenna systems. More specifically, the technology is directed to inexpensive, reusable, and interchangeable antenna elements and modules that are combinable into modular electronically scanned array antenna systems. Antenna systems described herein can be constructed from application-agnostic antenna elements or modules that are designed just once, manufactured in bulk, and reused for subsequent application. Such an approach minimizes NRE costs, facilitates bulk production, and significantly reduces per-unit costs. Indeed, the antenna elements described herein are combinable into modular electronically scanned array antenna systems that are configurable into various sizes and capabilities for any variety of high-performance commercial or consumer beamscanning applications such as, for example, satellite communication applications, 5G cellular communication applications, automotive radar, and IoT applications, etc.

As an example of advantageously reusing a design of a UTE or a UTM to reduce NRE costs associated with a beamscanning satellite, in some embodiments, one or both of a UTE and UTM can be designed just once, and an antenna system can be implemented that contains one of a first number of UTEs or UTMs placed in an automobile, a second number of UEs or UTMs placed on a bus, a third number of UTEs or UTMs placed on an airplane, and a fourth number of UTEs or UTMs placed on a cruise ship, wherein the first, the second, the third, and the fourth numbers of UTEs or UTMs are progressively increasing.

In some implementations, the technology described herein enables widespread usage of satellite connectivity by significantly reducing the cost of electronically scanned array antenna systems for satellite user terminals. Indeed, the techniques disclosed herein reduce NRE costs, which in combination with high volume construction enable high performance, sub $100 user terminals that can deliver transfer speeds greater than one Gbps. In other words, at least one of M UTEs and N UTMs can be manufactured in bulk. As used herein, the term "bulk" suggests commercially substantial quantities in the hundreds of thousands or millions. When produced in "bulk," it is expected that a manufacturing cost of each antenna system will be tantamount to an average manufacturer suggested retail price of a commercially available personal computer, which is more affordable that, say, a Gogo business wireless satellite system, which, as described above, has a cost that is tantamount to that of a house. Consequently, in addition to serving existing markets, this technology also facilitates new, non-existing markets that cannot currently afford access to high-speed internet connectivity.

As discussed above, traditional antenna elements include at least two and, often, three or more lossy radio frequency (RF) transitions. When stacked on top of each other, these lossy RF transitions can result in signal degradation of up to half of the total signal power, e.g., up to three decibels (dB). The technology discussed herein embeds or otherwise integrates the radiator (or antenna) with the active circuitry to reduce or eliminate lossy RF transitions.

Among other benefits, the modular antenna systems and solutions described herein facilitate flat beam-steerable antennas that are inexpensive, reusable, interchangeable, and modular. As mentioned above, disclosed UTMs can be designed just once, without considering a final form factor. With such an approach, NRE costs associated with UTMs are low, enabling an antenna system that is suitable for any high-performance commercial or consumer beamscanning applications, such as, for example, satellite communication applications, 5G cellular communication applications, automotive radar, or IoT applications, etc. Indeed, the modular antenna systems and solutions described herein enable widespread usage of satellite connectivity by significantly reducing the cost of phased arrays for satellite user terminals. The improvements described herein drastically decrease the overall costs of beamscanning array antennas as the modular antenna elements can be built at high volume. Additionally, the array designs reduce complexity of the base board further reducing overall costs of the system. As a result, the systems and solutions described herein not only serve existing markets, but also enable new, non-existing markets that currently do not have access to high-speed connectivity.

Additionally, the modularity and reusability of the designs discussed herein enable rapid scalability to various form factors, improving time-to-market. Indeed, new systems and solutions can be deployed in a matter of weeks using the building blocks disclosed herein.

As mentioned above, a disclosed satellite antenna system includes M user terminal modules (UTM), each being application-agnostic and including an antenna either to generate an incoming signal in response to incident satellite radio waves or to transmit an outgoing signal toward a receiver, such as a satellite, a ground unit, multiple satellites, multiple ground units, and any combination thereof. As used herein, the term "application-agnostic" means the same UTM can be used in any application, be it, for example, a car, a bus, or a cruise ship. The M active circuits of the N UTMs are controlled by control circuitry, which causes the M active circuits to process the incoming and outgoing signals. In some embodiments, the N UTMs are distributed among N user terminal modules (UTM), which each include a daisy-chain of O of the M active circuits. Buffers are regularly included to address the potential quality degradation and signal attenuation that can arise along the stages of the daisy-chain. For example, to address such attenuation, each UTM can further include a buffer placed after every P active circuits in order to correct any degradation (e.g., characteristics, like phase, amplitude, frequency, signal power, and signal noise) that has occurred in the daisy-chain. It should be noted that the number of modules in the system can vary, without limitation. For example, in the example shown in FIG. 8A, each of the four UTMs 806A-806D includes 16 active circuits and is connected to a control circuit, controller board 808. In the example shown in FIG. 8B, four UTMs 806A-1 to 806A-4, are daisy-chained in series, yielding a daisy-chain of 64 UTEs, together having one input and one output. Similarly, in the example shown in FIG. 8C, on the other hand, four stacks of modules each contain a daisy-chain of 64 active circuits, and each stack is connected to controller board 808. Due to the buffers that correct signal characteristics, the number of daisy-chained modules is unlimited. For example, while four UTMs are depicted daisy-chained together, any number of the modules may be daisy-chained together, such as 2, 3, 4, 5, 6 or more.

As shown, power supply 505 provides power to UT control 508. Power supply 505 in some embodiments (not shown) also provides power to each of the UTMs 506A-506M. In some embodiments, (not shown) each of the elements in each of the UTMs is solar-powered, so as to obviate the need to route power to all of the modules. In yet other embodiments, power is provided along each daisy-chain of modules. For example, each module, along with an output to be connected to a next module, also provides power for the next module. In this way, the system can be scaled to add new modules, each new module receiving an input and power from an existing module.

In one example, M equals 256, N equals 16, 0 equals 16, and P equals one of 2, 4, 8, or 16. Furthermore, disclosed UTEs are application-agnostic, which means they can be designed just once and reused multiple times. In other words, the M UTEs are application-agnostic and leverage a design of a prior, different application to reduce a design cost associated with the system.

As used herein, the term "electronically scanned array" refers to an electronically scanned array, or a computer-controlled array of antennas which creates a beam of radio waves that can be electronically steered to point in different directions without moving the antennas. It should be understood that the array may be controlled by any of a computer, a microcontroller, or an onboard processor As used herein, the term "die" is used in the context of integrated circuits and refers to a small block of semiconducting material on which a functional circuit is fabricated. Integrated circuits are typically produced in large batches on a single wafer of electronic-grade silicon or other semiconductor through processes such as photolithography.

As used herein, the term "integrated circuit packaging" refers to the final stage of semiconductor device fabrication, in which the block of semiconductor material is encapsulated in a supporting case that prevents physical damage and corrosion. The case, known as a "package," supports the electrical contacts which connect the device to a circuit board. As discussed herein, package material is typically very lossy at RF frequencies and, as a result, degrades RF signals that pass therethrough (e.g., from a die to the outside environment of the package).

A general overview and architecture of an example satellite communication system using various modular antenna systems for facilitating satellite and ground-to-ground communications is described in relation to FIG. 1. Various example environments are described in relation to FIGS. 2A and 2B. An example illustrating the modular architecture of the electronically scanned array antenna systems including modules and panels constructed using the inexpensive antenna elements is then described in relation to FIGS. 3 and 4, respectively. Thereafter, a more detailed description of the components, operation and processes of the antenna elements and example modular electronically scanned array antenna systems are described in relation to the subsequent figures.

FIG. 1 depicts a block diagram illustrating a general overview and architecture of a satellite communication system 100 including various example modular antenna array systems, according to some implementations. More specifically, the satellite communication system 100 includes various example modular antenna systems configured to establish satellite and ground-to-ground communication links (or connectivity) using electronically scanned antenna arrays formed with inexpensive antenna (or user terminal) elements. As discussed herein, the various example modular antenna array systems reuse the same, or similar, designs, thereby reducing NRE costs associated with each new design, Disclosed antenna elements can also be manufacturers at unprecedented scale to reduce the overall costs of the systems.

Although a single satellite is shown in the satellite communication system 100 of FIG. 1, it is appreciated that the system can include any number of satellites. Moreover, various types of modular antenna array systems are shown for the purposes of illustration, it is appreciated that an architecture may include one or all of the example modular antenna array systems.

As shown in the example of FIG. 1, the satellite communication system 100 includes a satellite 110 and various modular antenna array systems including a modular gateway antenna system 115, modular satellite user terminal antenna system 130 and 170, user terminal modules UTM 134, UTM 142, UTM 152, UTM 162 and UTM 172, and modular wireless antenna systems 140, 150 and 160. Each of the various modular antenna array systems includes at least one electronically scanned array antenna. Indeed, the electronically scanned array antennas are modular and, thus, can be formed in various sizes and capabilities using the inexpensive, reusable, and interchangeable antenna elements discussed herein. Indeed, the interchangeable antenna elements discussed herein are combinable into larger antenna (or user terminal) modules. These antenna (or user terminal) modules are themselves individually configurable as electronically scanned array antennas or, alternatively, combinable into larger antenna (or user terminal) panels for larger high-performance or high-throughput beamscanning applications such as, for example, satellite communications. As discussed herein, these electronically scanned array antennas utilize the same, or similar, design and manufacturing processes facilitating the ability to build the scanned array antennas at scale and, as a result, drastically decrease the overall costs of the scanned array antenna systems.

In some embodiments, the satellite 110 orbits in a geosynchronous orbit (GO), e.g., geosynchronous equatorial orbit (GEO), or a non-geosynchronous orbit, e.g., low-Earth orbit (LEO) or medium-Earth orbit (MEO). The modular gateway antenna system 115 can be a modular electronically scanned array antenna system that includes a satcom panel 116. Indeed, satcom panel 116 is an antenna (or user terminal) panel formed with multiple antenna (or user terminal) modules which, in turn, is formed with multiple antenna (or user terminal) elements.

As shown in the example of FIG. 1, the modular gateway antenna system 115 and the modular satellite user terminal antenna systems 130 and 170 are in communication with satellite 110. The modular satellite user terminal antenna system 170 is also in communication with user equipment 175. Furthermore, although shown as distinct entities, in some implementations, the modular satellite user terminal antenna system 170 can be integrated or combined with the user equipment 175 into a distinct or single device such as, for example, a mobile device with an integrated satellite transceiver, e.g., antenna (or user terminal) element for communicating directly with satellite 110.

Likewise, the modular satellite user terminal antenna system 130 is also in communication with modular wireless antenna system 140, modular wireless antenna system 150, and user equipment 135. The modular wireless antenna system 140 is in communication with user equipment 145. Modular wireless antenna system 150, in turn, is in communication with user equipment 155 and modular wireless antenna system 160. The modular wireless antenna system 160 is further in communication with user equipment 165.

The user equipment 135, 145, 155, 165 and 175 may be a user device such as a mobile device, a telephone, a smartphone, a tablet, a laptop computer, a computer, a wearable device, a smart watch, an audiovisual device, an Internet-of-things (IoT) device or any device including the capability to communicate with the modular antenna array systems. Additionally, the user equipment 135, 145, 155, 165, and 175 may be a device (e.g., access point, small cell, etc.) that is used to communicate with one or more end user devices (not shown).

In operation, the various example modular antenna array systems communicate with user equipment via bidirectional access links (having a forward access link and return access link). Similarly, the modular wireless antenna system 150 communicates with the modular wireless antenna system 160 via bidirectional access links (having a forward access link and return access link). For example, the bidirectional access link can be an inter-city link, an example of which is shown and discussed in greater detail with reference to FIG. 2A.

The modular gateway antenna system 115 may have access to Internet 125 or one or more other types of public, semi private, or private networks. As shown in the example of FIG. 1, modular gateway antenna system 115 is in communication with infrastructure 120, which is capable of accessing the Internet 125 or one or more other types of public, semi private or private networks. The modular gateway antenna system 115 may also be coupled to various types of communication backhaul, including, for example, landline networks such as optical fiber networks or public switched telephone networks (not shown).

In some implementations, the modular gateway antenna system 115 may communicate with other gateways, through the infrastructure 120 or alternatively may be configured to communicate without using the infrastructure 120. The infrastructure 120 may include, in whole or part, a network control center (NCC), a satellite control center (SCC), a wired and/or wireless core network, and/or any other components or systems used to facilitate operation of and/or communication with the satellite communication system 100.

Communications between the satellite 110 and the modular gateway antenna system 115 in both directions are called feeder links, whereas communications between the satellite 110 and the modular satellite user terminal antenna systems 130 and 170 are called service links in both directions.

Figure 2A:
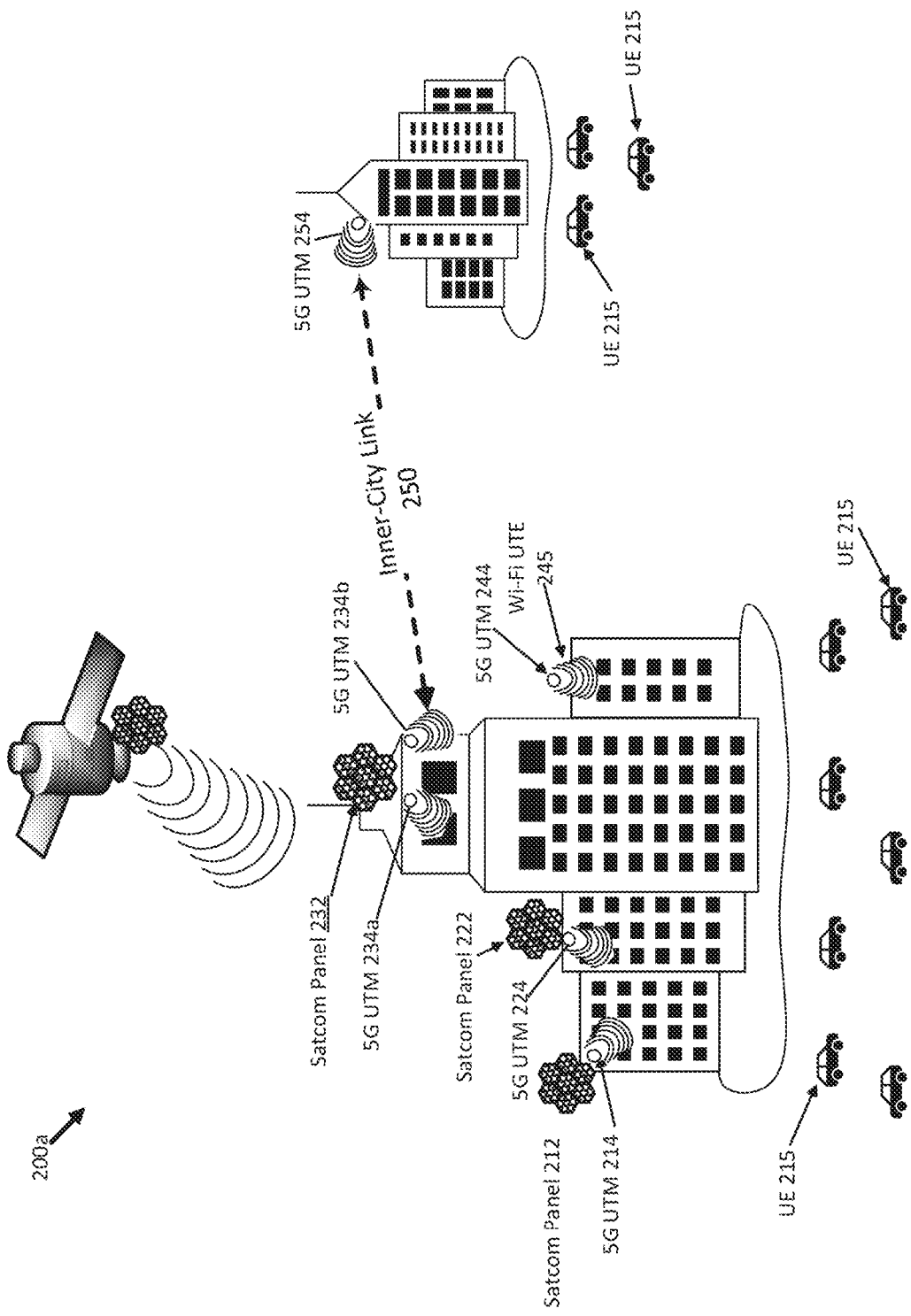
FIGS. 2A and 2B depict block diagrams illustrating example satellite communication systems including various modular antenna systems configured to establish satellite and ground-to-ground communication links (or connectivity) using electronically scanned antenna arrays formed with inexpensive antenna (or user terminal) elements, according to some implementations.
Figure 2B:
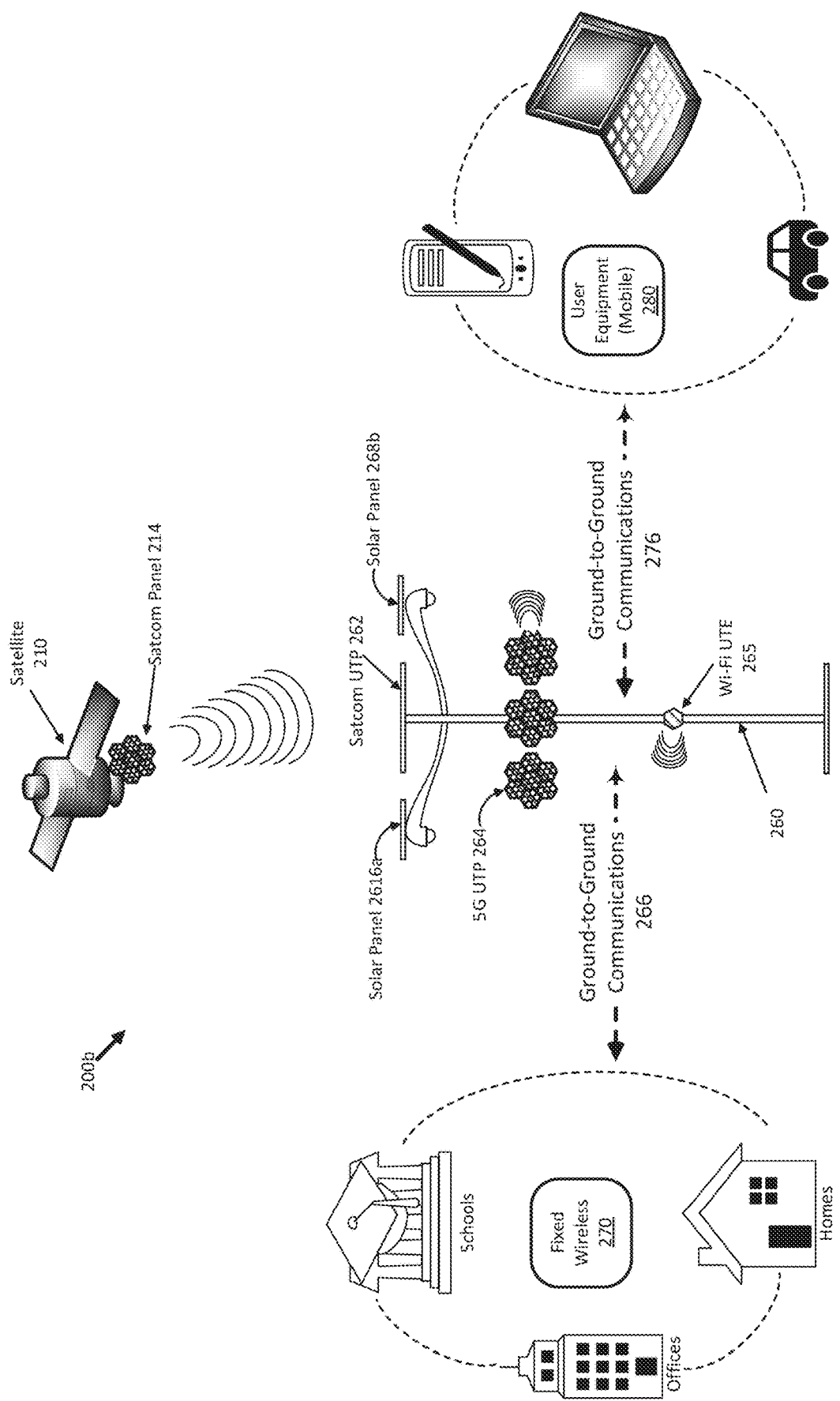

FIGS. 2A and 2B depict block diagrams illustrating examples of satellite communication systems 200a and 200b including various modular antenna systems configured to establish satellite and ground-to-ground communication links (or connectivity) using electronically scanned antenna arrays formed with inexpensive antenna (or user terminal) elements, according to some implementations.

Referring first to the example of FIG. 2A, satellite communication system 200a includes various modular antenna systems configured to establish satellite and ground-to-ground communication links (or connectivity) using electronically scanned antenna arrays formed with inexpensive antenna (or user terminal) elements. More specifically, the example of FIG. 2A illustrates utilizing the various modular antenna systems including satcom panels 212, 222, 232m 5G User terminal Modules UTM 214, UTM 224, UTM 234a, UTM 234b, UT 244, UTM 214, 224, 234a, 234b, 244, 254, and Wi-Fi user element 215 for providing inter-city connectivity (e.g., inter-city link 250).

FIG. 2B depicts an example whereby infrastructure (e.g., lamppost) 260 can be fitted (or retrofitted) with the modular electronically scanned array antenna systems discussed herein to establish or improve connectivity in a particular area or region. As shown, system 200b includes lamppost 260, solar panels 2616a and 268b, satcom (User Terminal Panel UTP 262, 5G UTP 264, ground-to-ground communications 266 and 276, (User Equipment) UE 280, fixed wireless 270m and Wi-Fi UT 266.

In some implementations, the infrastructure (e.g., lamppost) 260 can be a self-sustained unit. For example, infrastructure 260 can be "plug-and-play" whereby, after installation, the unit is immediately operable for providing connectivity to fixed wireless 270 systems, e.g., nearby homes or schools in a village and other mobile user equipment 280 within range.

Figure 3:
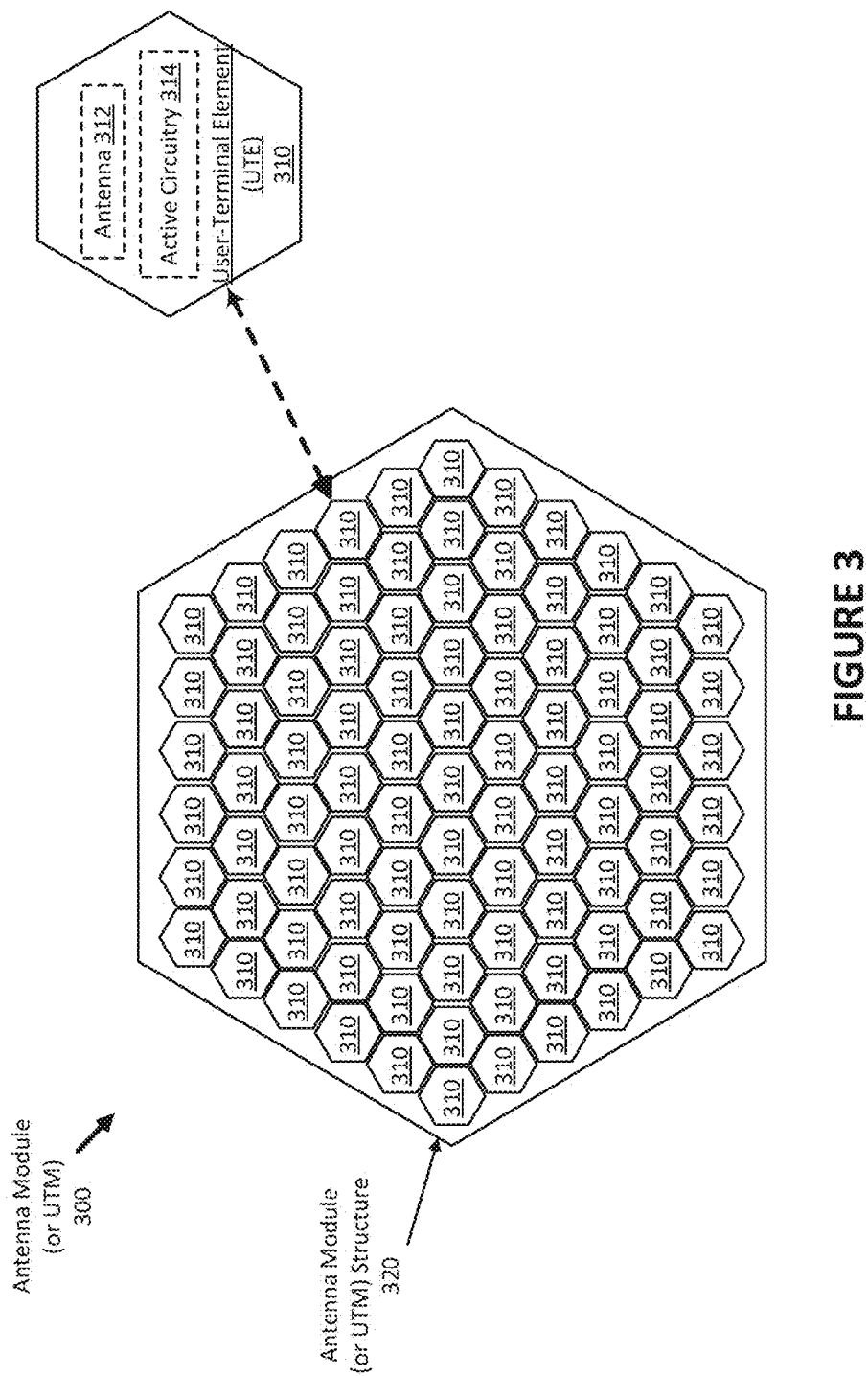
FIG. 3 depicts a block diagram illustrating an example modular architecture of an antenna module formed with multiple antenna (or user terminal) elements, according to some implementations.

FIG. 3 depicts a block diagram illustrating an example modular architecture of an antenna module 300 formed with multiple antenna (or user terminal) elements 310, according to some implementations. More specifically, the example of FIG. 3 illustrates antenna module 300 with an exploded view of example components of antenna (or user terminal) element 310. The antenna module 300 can be any one of the antenna modules shown and discussed with reference to FIG. 1, although alternative configurations are possible. Furthermore, although the antenna (or user terminal) elements 310 and the antenna (or user terminal) module 300 are primarily shown with hexagonal form factors herein, it is appreciated that other form factors (e.g., triangular, square, circular, etc.) are also possible. Additional example antenna (or user terminal) module configurations are shown and discussed in greater detail below.

As shown in the example of FIG. 3, the antenna (or user terminal) module 300 includes multiple antenna (or user terminal) elements 310 placed on or within a structure 320. The antenna (or user terminal) elements 310 can be placed in various configurations on or within the structure 320 to form the antenna module 300. Additional example structures are shown and discussed in greater detail below.

Referring again to FIG. 3, each antenna (or user terminal) element 310 includes a radiator (or antenna) 312 and active circuitry 314. The active circuitry 314 can be embodied in a die and can include various components such as, for example, amplifiers, RF circuitry, digital-to-analog (D/A) converters, analog-to-digital (A/D) converters, etc. Although not shown in the example of FIG. 3, the die is larger than a die from a traditional antenna element. Indeed, in some embodiments, the die has the same (or similar) footprint as the radiator (or antenna) element. As discussed herein, the larger die facilitates integration of various components (e.g., RF circuitry, digital-to-analog (D/A) converters, analog-to-digital (A/D) converters, etc.) that were not previously embodied in a die of a traditional antenna element due to design and size limitations.

As discussed herein, coupling the radiator (or antenna) 312 and the active circuitry 314 traditionally requires at least two and, often, three or more lossy radio frequency (RF) transitions. When stacked on top of each other, these lossy RF transitions result in signal degradation of up to half of the total signal power, e.g., up to three dB. Implementations discussed herein embed or otherwise integrate the radiator (or antenna) 312 with the active circuitry 314 to reduce or eliminate these lossy RF transitions.

Additionally, the antenna elements discussed herein integrate various components into the active circuitry 314 as compared to traditional antenna elements for phased array antenna systems. For example, the antenna elements discussed herein integrate RF circuitry, D/A converters, and A/D converters into the active circuitry 314. Moreover, various components of traditional antenna elements are no longer required (e.g., phase shifters).

In some implementations, the radiator (or antenna) 312 and the active circuitry 314 are integrated or embedded in a single die (e.g., Silicon die) and packaged together in order to eliminate the lossy RF transitions. The single die is referred to herein as an antenna-on-chip (AOC) element. The AOC element may include an application specific integrated circuit (ASIC) which may be packaged as an integrated circuit (IC). The various layers and components of an example AOC element are shown and discussed in greater detail below.

In some implementations, the radiator (or antenna) 312 and the active circuitry 314 are closely integrated but not on a single die (e.g., Silicon die) in order to reduce the lossy RF transitions to a single lossy RF transition while allowing the components of the antenna element to be obtained via tape and reel. Tape and Reel generally refers to a process of packing surface mount devices (SMD's) by loading them into individual pockets of a pocket (or carrier) tape. For example, the units are sealed in the carrier tape with a cover tape, usually by heat or pressure. The carrier tape can then wound around a reel for convenient handling and transport. The reel is enclosed in a reel box before it is finally shipped to the customer. As discussed herein, the ability to obtain components via tape and reel can reduce component costs increasing the ability to create and build antenna elements at scale for module beamscanning antenna array systems.

Furthermore, closely integrating the radiator (or antenna) 312 and the active circuitry 314, but not on a single die, facilitates use of three-dimensional (3D) printing techniques for printing the radiator (or antenna) 312. Examples illustrating this integration are shown and discussed in greater detail below.

Figure 4:
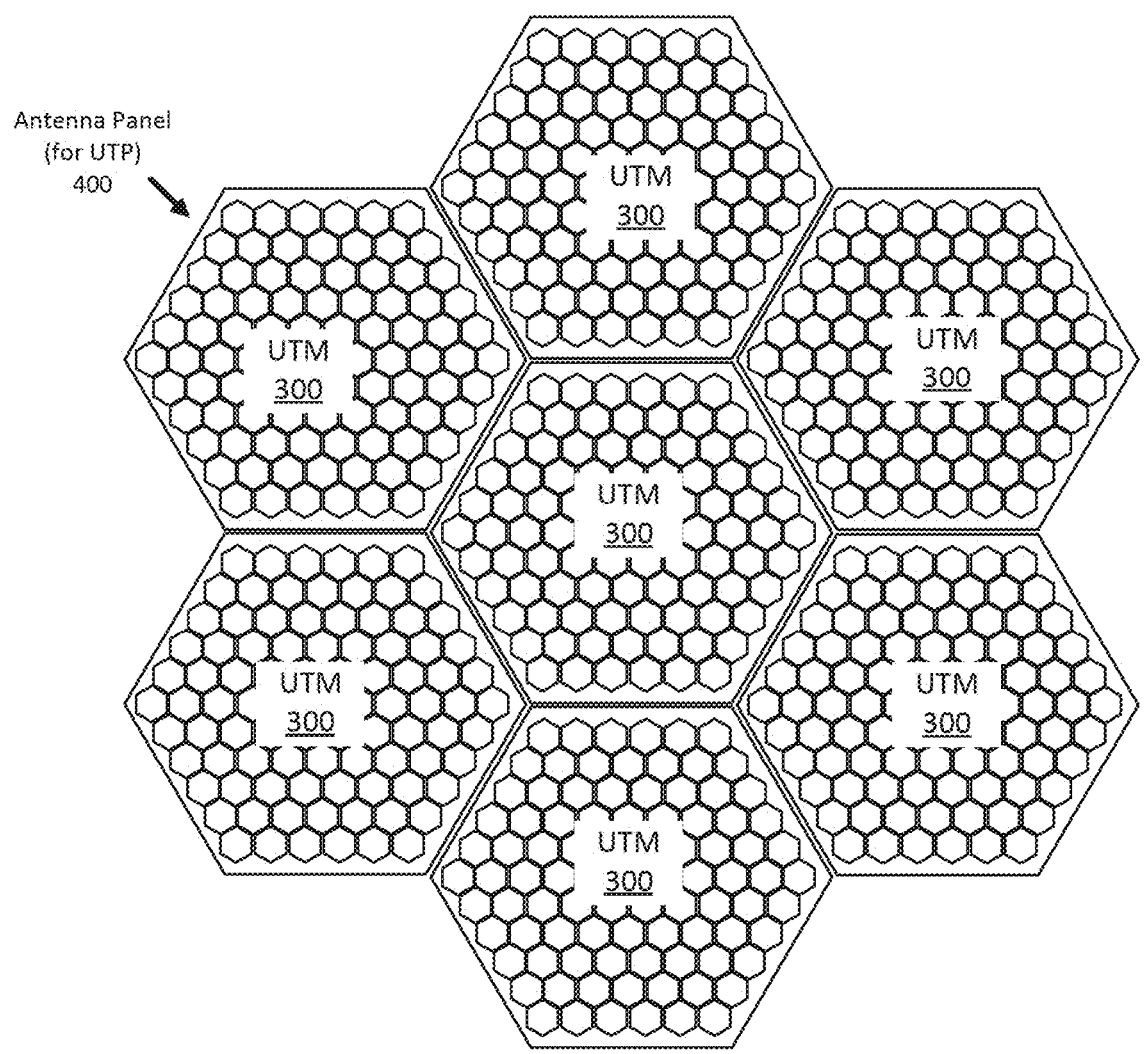
FIG. 4 depicts a block diagram illustrating an example modular architecture of an antenna (or user terminal) panel formed with multiple antenna modules, according to some implementations.

FIG. 4 depicts a block diagram illustrating an example modular architecture of an antenna (or user terminal) panel 400 formed with multiple antenna modules 300, according to some implementations. More specifically, the example of FIG. 4 illustrates the antenna (or user terminal) panel 400 formed with multiple antenna modules 300 of FIG. 3. The antenna (or user terminal) panel 400 can be any one of the antenna panels shown and discussed with reference to FIG. 1 (e.g., satcom panels 112, 114, 116 or 132), although alternative configurations are possible. Furthermore, although the antenna modules 300 are primarily shown with hexagonal form factors herein, it is appreciated that other form factors, e.g., triangular, square, rectangular, circular, etc., including combinations or variations thereof are also possible.

Another benefit of disclosed embodiments is that different user terminal elements (UTE) can be selected to populate each user terminal module. Most antennas are resonant devices, which operate efficiently over a relatively narrow frequency band. An antenna must be tuned (matched) to the same frequency band as the radio system to which it is connected, otherwise reception and/or transmission will be impaired. Disclosed embodiments allow for each of multiple UTEs to be tuned to one or more of multiple frequency ranges. In some embodiments each of UTEs on a first UTM is tuned to a first frequency range in order to maximize the throughput and bandwidth of radio wave signals communicated at the first frequency range by the UTEs on the first UTM. In some other embodiments, each of UTEs on a first UTM is tuned to a different frequency range in order to maximize a variety of frequency ranges at which radio waves are communicated by the UTEs on the first UTM.

As discussed herein, an antenna (user terminal) panel can be formed or configured from multiple antenna modules based on the particular application. For example, high-performance commercial and consumer beamscanning applications that require communications over long distances or applications requiring higher levels of throughput (or bandwidth) may necessitate larger panels. Advantageously, these antenna (or user terminal) panels do not require custom designs as they can be modularly constructed using the interchangeable building blocks, e.g., antenna (user terminal) modules and/or antenna (user terminal) elements.

Figure 5:
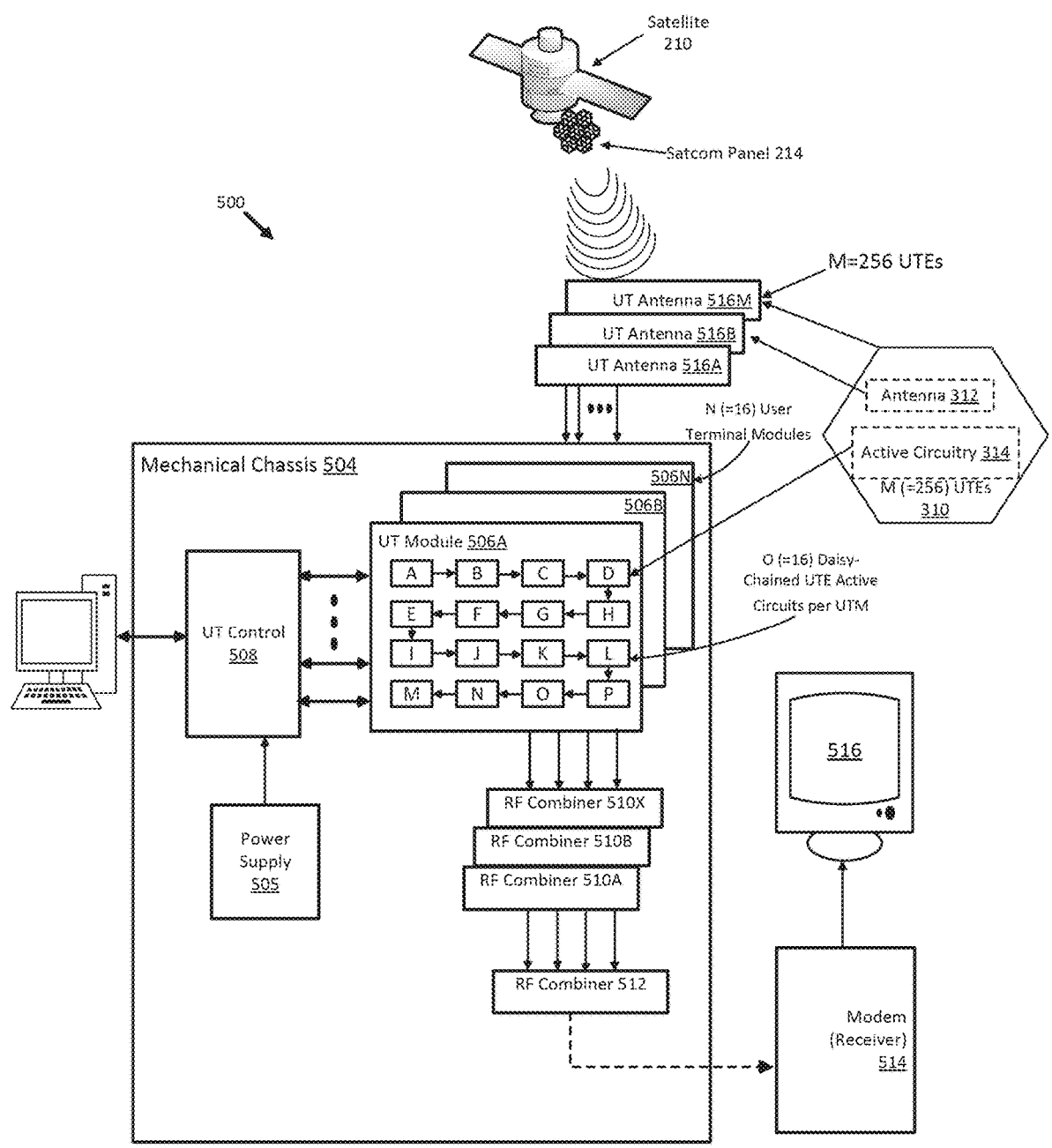
FIG. 5 depicts a block diagram illustrating an example system (beamscanning antenna) to transmit and receive satellite radio wave signals for an application, according to some implementations.

FIG. 5 depicts a block diagram illustrating an example system (beamscanning antenna) to transmit and receive satellite radio wave signals for an application, according to some implementations. As shown, satellite antenna system 500 includes a mechanical chassis 504, which contains user terminal (UT) modules 506A, 506B, up to 506N, with N equal to 16. Each of the UT modules includes sixteen daisy-chained UTEs, which are each examples of UTE 310, and which each contain an antenna 312 and active circuitry 314. In other embodiments, for example as shown in FIGS. 8B and 8C, more than sixteen UTEs are daisy-chained. The processing performed by the active circuits of the UTEs is controlled by UT control 508.

As shown, the sixteen UTMs provide sixteen analog signals to a first level of RF combiners 510A, 510B, up to 510X, with X equal to 4, since each combiner receives signals from four UTMs. A second combinatorial level, RF combiner 512, combines the signals from the first level. It should be noted that in other embodiments, there can be more or fewer combiners. It also should be noted that the number of levels of combiners can vary. In other words, while two levels of combiners are shown in FIG. 5, in other embodiments, there can be more or fewer levels.

Also shown are UT antennas 516A, 516B, up to 516M. Here, M equals 256, N equals 16, and O, the number of UTEs per UTM, equals 16.

In operation, satellite antenna system 500 provides satellite communications for a personal computer application. In doing so, satellite antenna system 500 communicates with satellite 210, which is shown including a satcom panel 214.

In some embodiments, each of the M antennas of the M UTEs is tuned to one or more of a plurality of different frequency ranges. In some embodiments, each of the antennas on each of the UT modules is identical. As shown, the incoming signal received from the antenna of each UTE is an analog voltage, and each of the M active circuits receives, processes, and produces an output signal having an analog voltage, and each of the N UTMs produces an analog signal that is combined with analog signals from other UTMs. Received radio wave signals are delivered from RF combiner 512 to modem (Receiver) 514 which provides them to device 516, such as a TV or an internet receiver.

Figure 6:
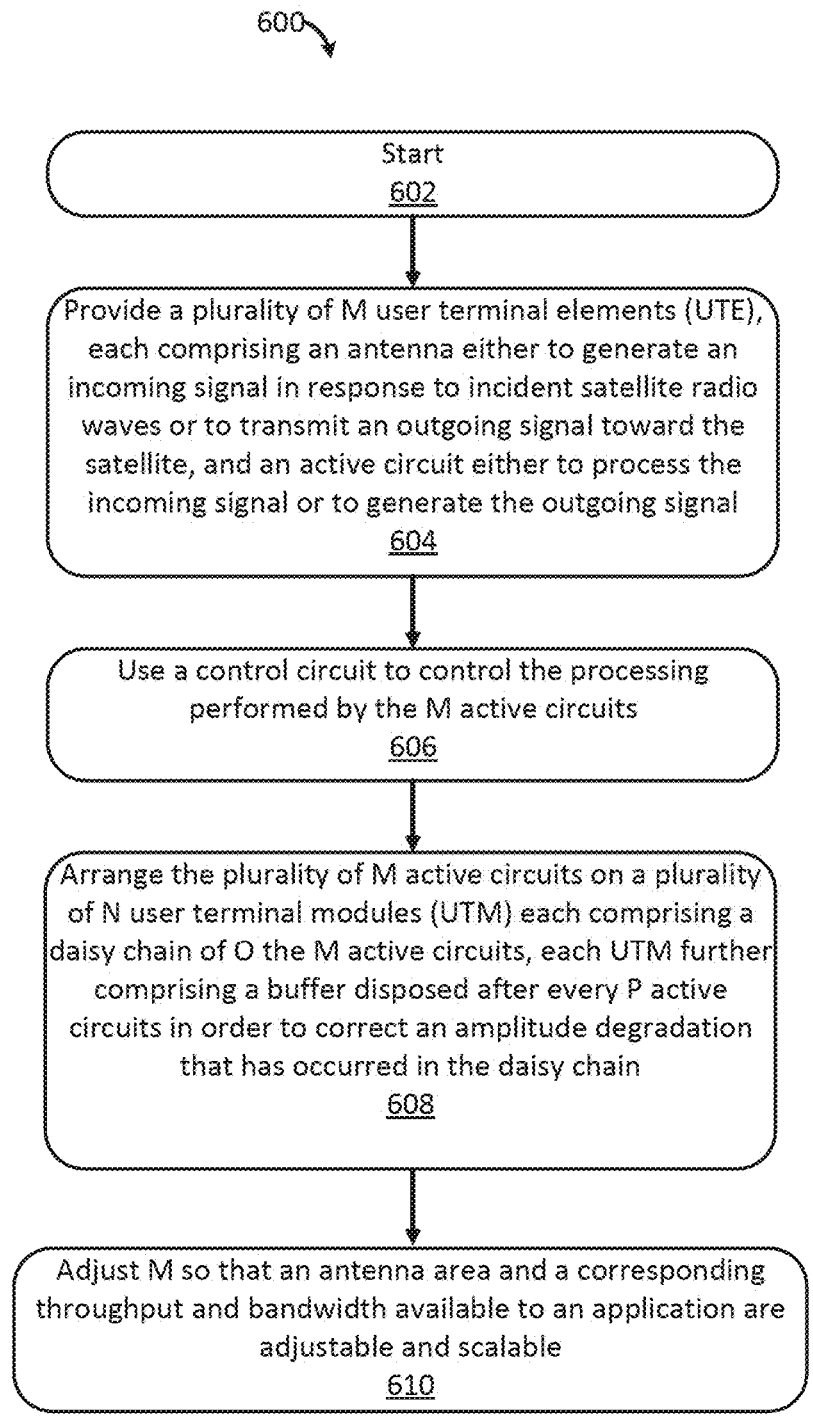
FIG. 6 depicts a process flow diagram illustrating actions performed by a beamscanning antenna to communicate signals with a satellite for an application, according to some implementations.

FIG. 6 depicts a process flow diagram illustrating actions to be performed by a beamscanning antenna system to communicate signals with a satellite for an application, according to some implementations. As shown, process 600 starts at 602. At 604, the beamscanning antenna system is to provide M application-agnostic UTEs (user terminal elements). Each UTE includes an antenna and an active circuit, so M antennas and M active circuits are provided at operation 604. Each antenna is either to generate an incoming signal in response to incident satellite radio waves or to transmit an outgoing signal toward a receiver, such as one or more satellites, one or more ground units, and any combination thereof. Each active circuit is to process the incoming and outgoing signals.

The UTEs provided at 604 are application-agnostic insofar as they are based on a prior, existing design and do not incur additional NRE now. The use of application agnostic UTEs helps achieve a low-cost antenna system, which is an advantage of disclosed embodiments. For example, millions of UTEs can be manufactured in bulk, building a supply of low-cost UTEs.

The selection of the M UTEs to provide at operation 604 may consider the intended application for the system. As mentioned above, antennas are tuned (matched) to the same frequency band as the radio system to which they connect, otherwise reception and/or transmission may be impaired. So, for example, when used to connect to Ku-band, or Ka-band satellite signals, antennas can be used that are tuned to Ku-Ka frequency bands.

At operation 606, the system is to use a control circuit to control the processing performed by the M active circuits. For example, referring to FIG. 5, user terminal control 508 is coupled to N user terminal modules (UTM), and controls the processing performed by 16 active circuits on each UTM. Similarly, referring to FIG. 8A, controller board 808 is coupled to all four UTMs 806A-806D, and controls the processing performed by 16 active circuits on each UTM.

Some embodiments reduce costs and area required for routing by passing digital control signals along a daisy-chain of active circuits, rather than to route control signals from control circuitry to each of the active circuits. In particular, in some embodiments, digital control signals, clocks, and power are passed between modules using input and output buffers, such as buffers 710 and 712 of FIG. 7. In such a scenario, system costs can be further reduced by exploiting the daisy-chain concept to use just one controller circuit to control multiple active circuits in the daisy-chain.

In some such scenarios the daisy-chain passes digital control signals, power, and clock signals; the analog processing is performed by combiners, such as combiner 510A-510X of FIG. 5. In some embodiments, a signal from each of the UTMs is to return to the controller via the daisy chain, the controller to monitor the signal to gauge health of the system (i.e. a status signal).

Referring to FIG. 8B, for example, controller board 808 is coupled to provide an input to a first UTM 806A-1, and to receive an output from a fourth UTM 806A-4. Similarly in FIG. 8C, controller board 808 is coupled to provide an input to a first UTM 806A-1 of four stacked UTMs, and to receive an output from a fourth UTM 806A-4 of the four stacked UTMs. In such an embodiment, a daisy-chain of 64 active circuits performs the signal processing, and controls can be routed along that daisy-chain.

It should be noted that the daisy-chaining of UTMs allows scaling and expansion of the system without limitation. For example, with reference to FIG. 8C, additional UTMs may be added to the existing daisy-chain of 64 active circuits. The existence of buffers at the input and output of each UTM enables such scaling, because the buffers correct any signal degradations that may occur within the daisy-chained active circuits of each UTM.

At operation 608, the antenna system is to arrange the plurality of M active circuits on a plurality of N user terminal modules (UTM) each comprising a daisy-chain of O of the M active circuits, each UTM further comprising a buffer placed after every P active circuits in order to correct any amplitude degradation that has occurred in the daisy-chain.

In some embodiments, each of the N UTMs may contain UTEs tuned to various different frequency ranges. In other embodiments, one or more of the N UTMs contains antennas tuned to the same or similar frequency. At 610, the system is to adjust M so that an antenna area and a corresponding throughput and bandwidth available to an application are adjustable and scalable. This may involve adding more UTEs to increase antenna area, throughput, and bandwidth.

Figure 7:
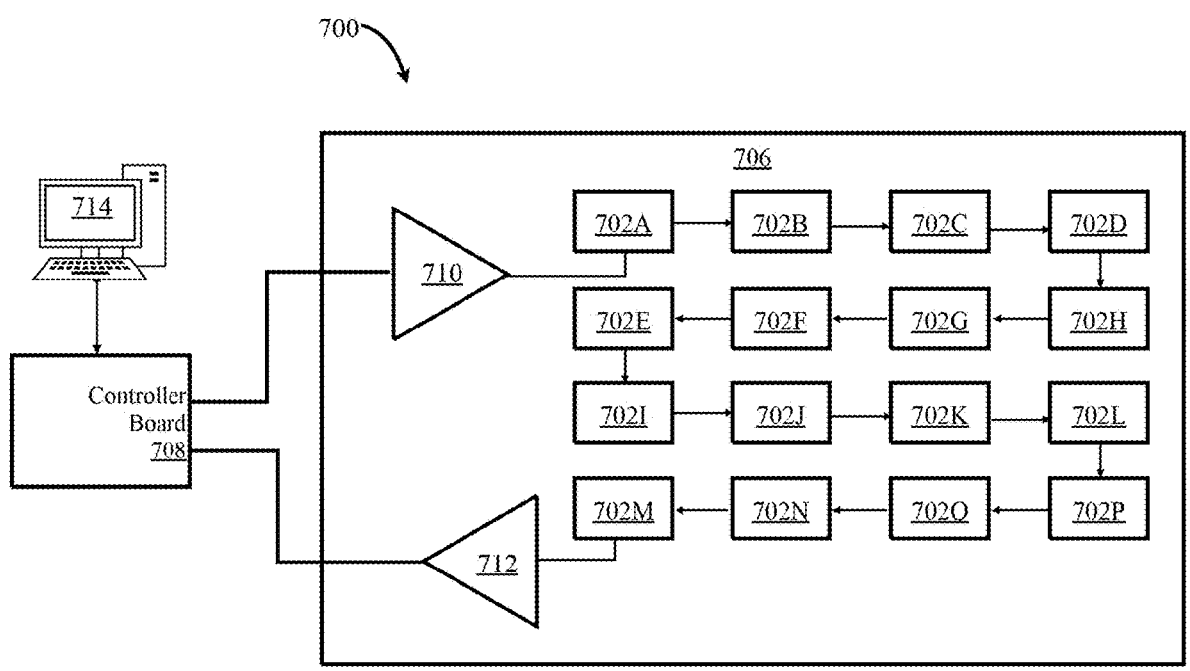
FIG. 7 depicts a block diagram illustrating an example user terminal module, user terminal control module, and amplitude adjustment buffers, according to some implementations.

FIG. 7 depicts a block diagram illustrating an example user terminal module, user terminal control module, and digital signal buffers, according to some implementations. As shown, system 700 is an example of UT control 508 and one of the UTMs 506A-506N of FIG. 5. Here, UTM 706 includes sixteen UTEs 702A-702P. UTM 706 is configured to receive an incoming signal from buffer 710, feed the signal to be processed through a daisy-chain of UTEs, and provide an outgoing signal through buffer 712. Buffers 710 and 712 are connected to controller board 708, which services a personal computer 714 application. In some embodiments, controller board 708 monitors the health of the system by monitoring one or more signal characteristics of the signal received from buffer 712.

Figure 8A:
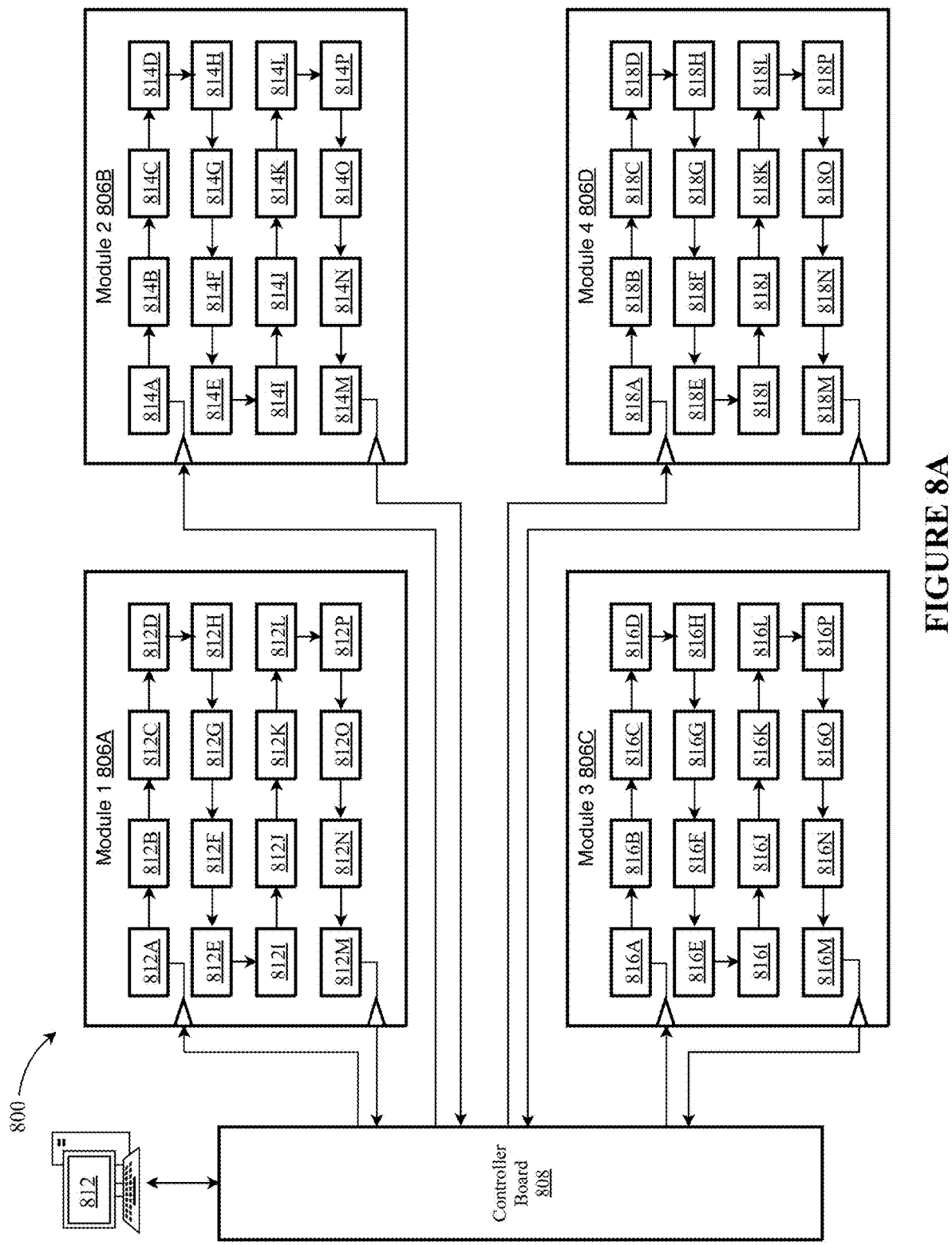
FIG. 8A depicts a block diagram illustrating an example of multiple user terminal modules and a user terminal control module, according to some implementations.
Figure 8B:
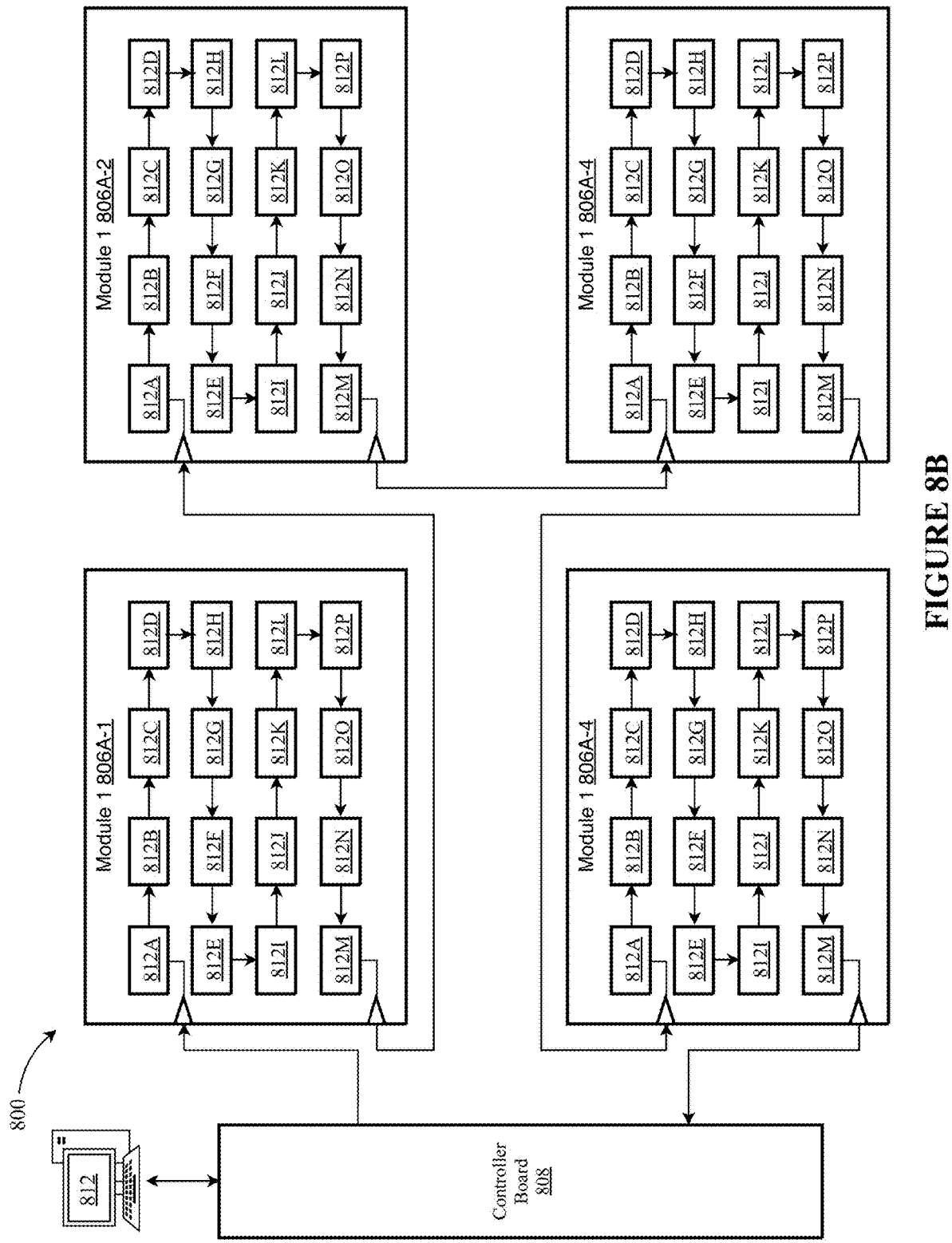
FIG. 8B depicts a block diagram illustrating an example of multiple user terminal modules and a user terminal control module, according to some implementations.
Figure 8C:
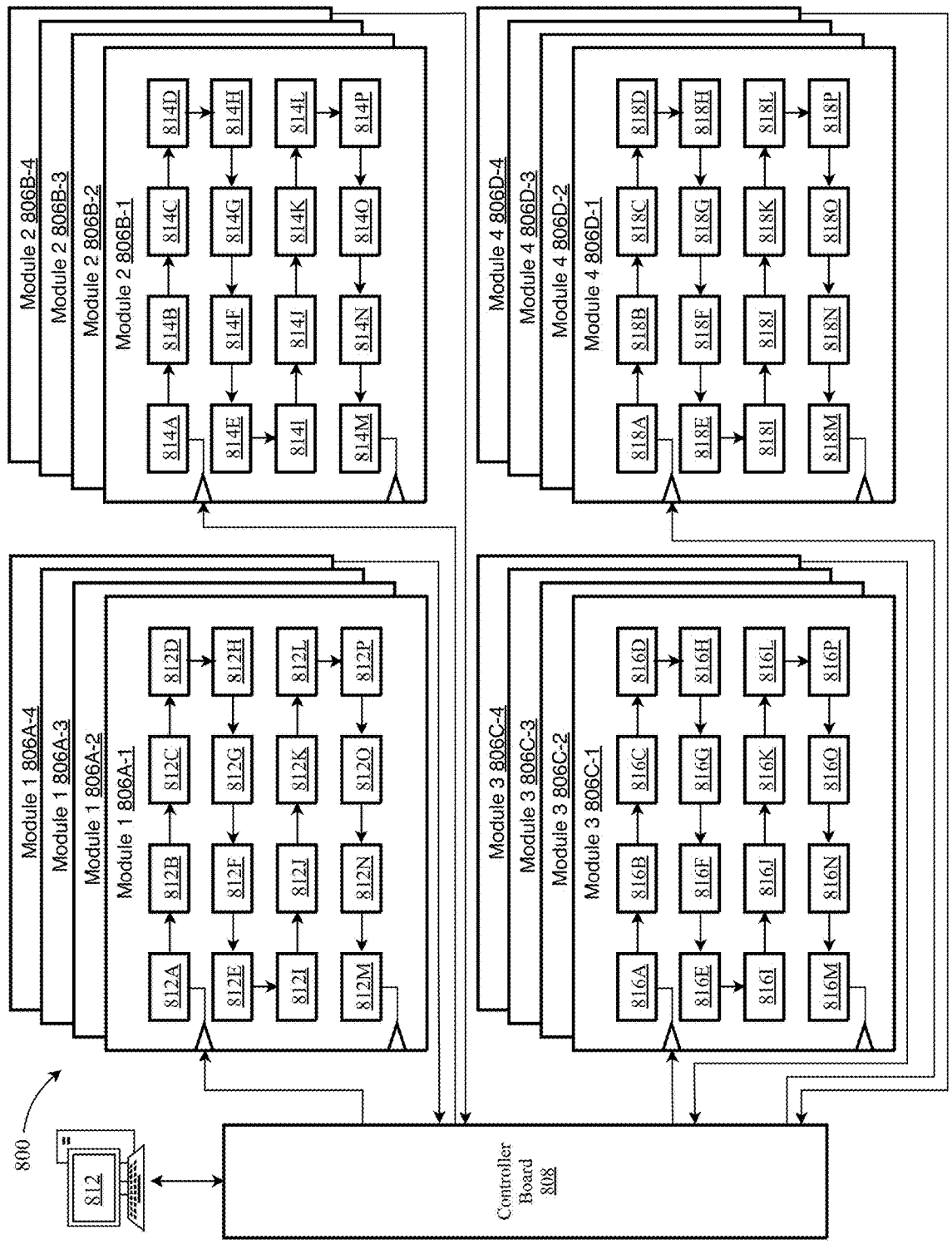
FIG. 8C depicts a block diagram illustrating an example of multiple user terminal modules and a user terminal control module, according to some implementations.

FIGS. 8A-8C depict block diagrams illustrating user terminal modules interconnected in various configurations, according to some implementations. It should be noted that UTMs for use in disclosed antenna systems can be selected according to various criteria, including a target frequency range, a target polarization, and a target beam direction. For example, as mentioned above, UTMs can be selected that are tuned to a particular frequency range, such as the Ku-Ka frequency band. Further, antennas can be selected according to a polarization of received signals, be it horizontal, vertical, left-hand circular, or right-hand circular polarization.

FIG. 8A depicts a block diagram illustrating an example of multiple user terminal modules and a user terminal control module, according to some implementations. Here, antenna system 800 includes four UTMs 806A, 806B, 806C, 806D, each of which contains a daisy-chain of sixteen UTEs on the respective modules. Here, each of the four UTMs (806A, 806B, 806C, 806D) has a separate connection to controller board 808, which services a personal computer 812 application.

FIG. 8B depicts a block diagram illustrating an example of multiple user terminal modules and a user terminal control module, according to some implementations. Here, antenna system 800 includes four UTMs 806A1-4, which are examples of UTMs 806A1-4 of FIG. 8C. While FIG. 8C showed each of the 64-deep daisy-chains implicitly, here, the 64-deep daisy-chain of UTMs 806A1-4 are shown explicitly. As described with respect to FIG. 8C, any number of UTMs may be serially daisy-chained together. Additional UTMs can be inserted into the daisy-chain, thereby scaling the system 800.

FIG. 8C depicts a block diagram illustrating an example of an antenna system, according to some implementations. Here, antenna system 800 includes sixteen UTMs, where four modules are in each daisy chains 806A1-4, 806B1-4, 806C1-4, and 806D1-4. Each of the daisy chains is made up of a total of 64 UTEs, 16 from each module in the daisy chain. For example, the first daisy chain includes modules 806A-1, 806A-2, 806A-3 and 806A-4. Module 806A-1 is the only one module in the daisy chain that is required to be connected to the controller board 808. The output of module 806A-1 is connected to the input of module 806A-2. The output of module 806A-2 is connected to the input of module 806A-3. The output of module 806A-3 is connected to the input of module 806A-4. The output of module 806A-4 may be connected to the controller board 808 for additional monitoring. While the modules 806A1-4,806B1-4, 806C1-4, and 806D1-4 are depicted in FIG. 8C in a stacked configuration, in use the modules would be arranged in a non-overlapping manner such that the UTEs may be able to receive and transmit signals, and would not be occluded by another module.

As with the system of FIG. 8A, the UTMs here have four connections to controller board 808. Unlike the system of FIG. 8A, the daisy-chains here consist of 64 UTEs. By daisy-chaining multiple UTMs together, four times as many UTEs can be controlled by controller board 808, thus reducing the per-UTE costs of the system. According to disclosed embodiments, any number of UTMs may be serially daisy-chained. Additional UTMs can be inserted into the daisy-chain, thereby scaling the system 800.

Figure 9:
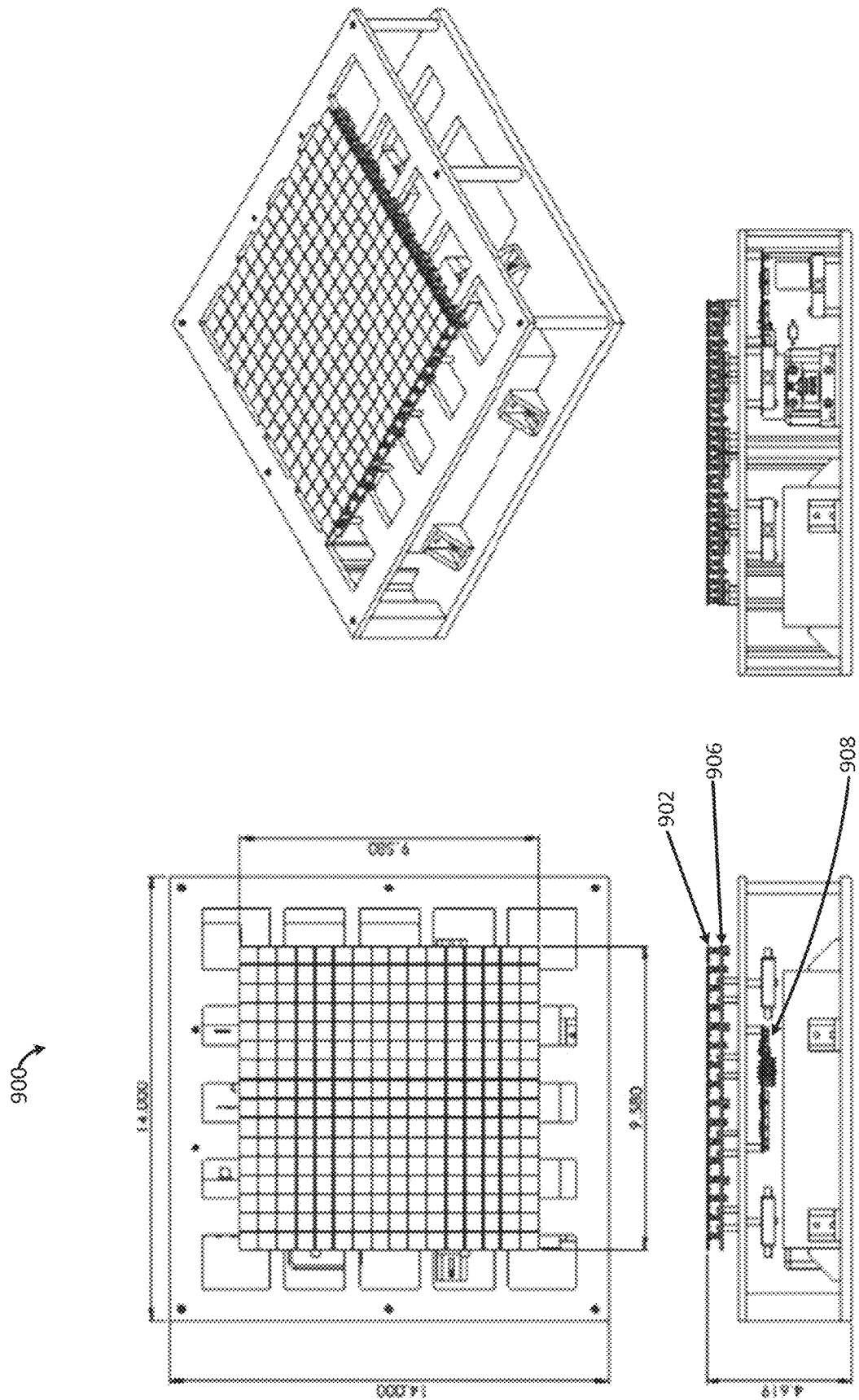
FIG. 9 depicts front and side elevations, a plan view, and a perspective view of a beamscanning antenna chassis, according to some implementations.

FIG. 9 depicts front and side elevations, a plan view, and a perspective view of a beamscanning antenna chassis, according to some implementations. As shown in engineering drawing 900 are in the front elevation, three printed circuit boards (PCBs) are stacked, including antenna PCB 902, a module PCB 906, and UT control PCB 908. Together, the UT antenna elements and active circuit elements are configured to perform operations as described herein. Antenna PCB 902 and module PCB 906 are stacked as further illustrated and described with respect to FIG. 10.

Figure 10:
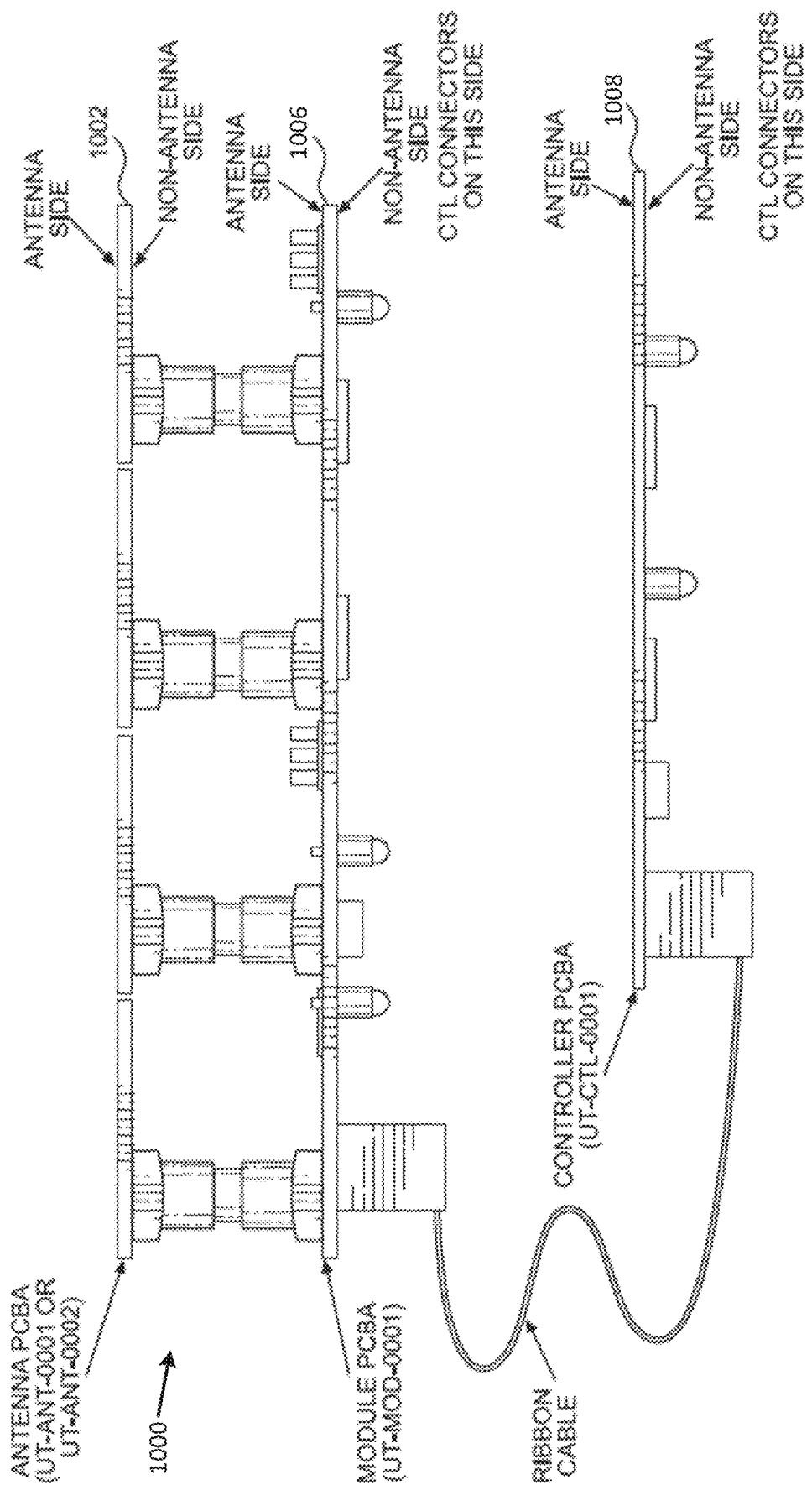
FIG. 10 depicts cross-sectional and perspective views of an antenna board mounted onto a module board that is connected to a controller board, for use in a beamscanning antenna, according to some implementations.

FIG. 10 depicts a cross-sectional view of an antenna printed circuit board mounted atop a module printed circuit board that is connected to a controller board for use in a beamscanning antenna, according to some implementations. As shown, cross-sectional view 1000 includes antenna PCB 1002, module PCB 1006, and control PCB 1008. Together, the UT antenna elements are placed on antenna PCB 1002. Likewise, the active circuit elements are placed on module PCB 1006, as controlled by control circuitry on control PCB 1008 are configured to perform operations as described herein, including, for example, as described with respect to FIG. 6.

Figure 11:
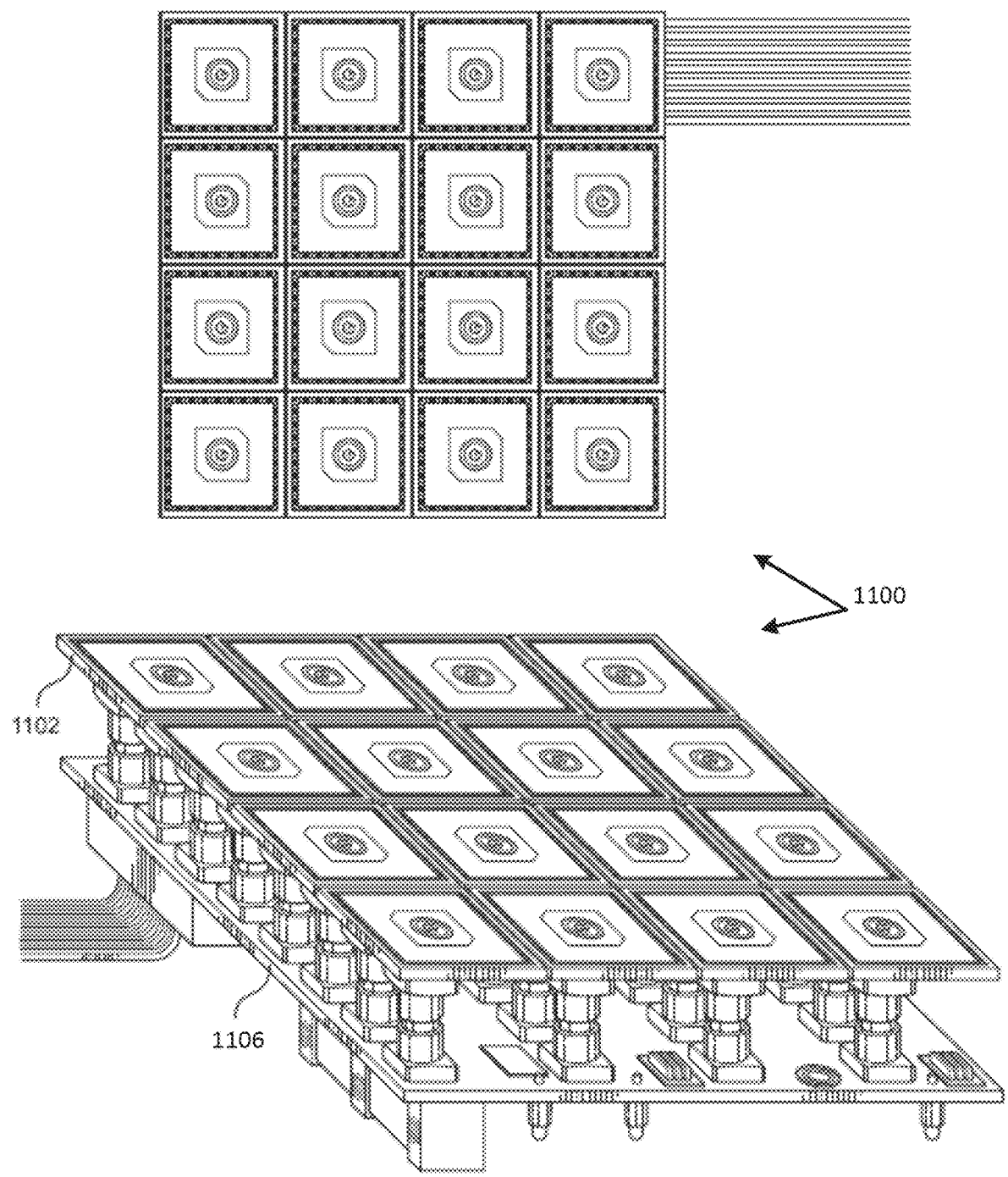
FIG. 11 depicts plan and perspective views of an antenna board mounted onto a module board for use in a beamscanning antenna, according to some implementations.

FIG. 11 depicts plan and perspective views of an antenna board mounted onto a module board for use in a beamscanning antenna, according to some implementations. Assembly 1100 is shown in both plan view, in which antenna board 1102 is visible, and in perspective view, in which both antenna board 1102 and module board 1106 are visible.

Figure 12:
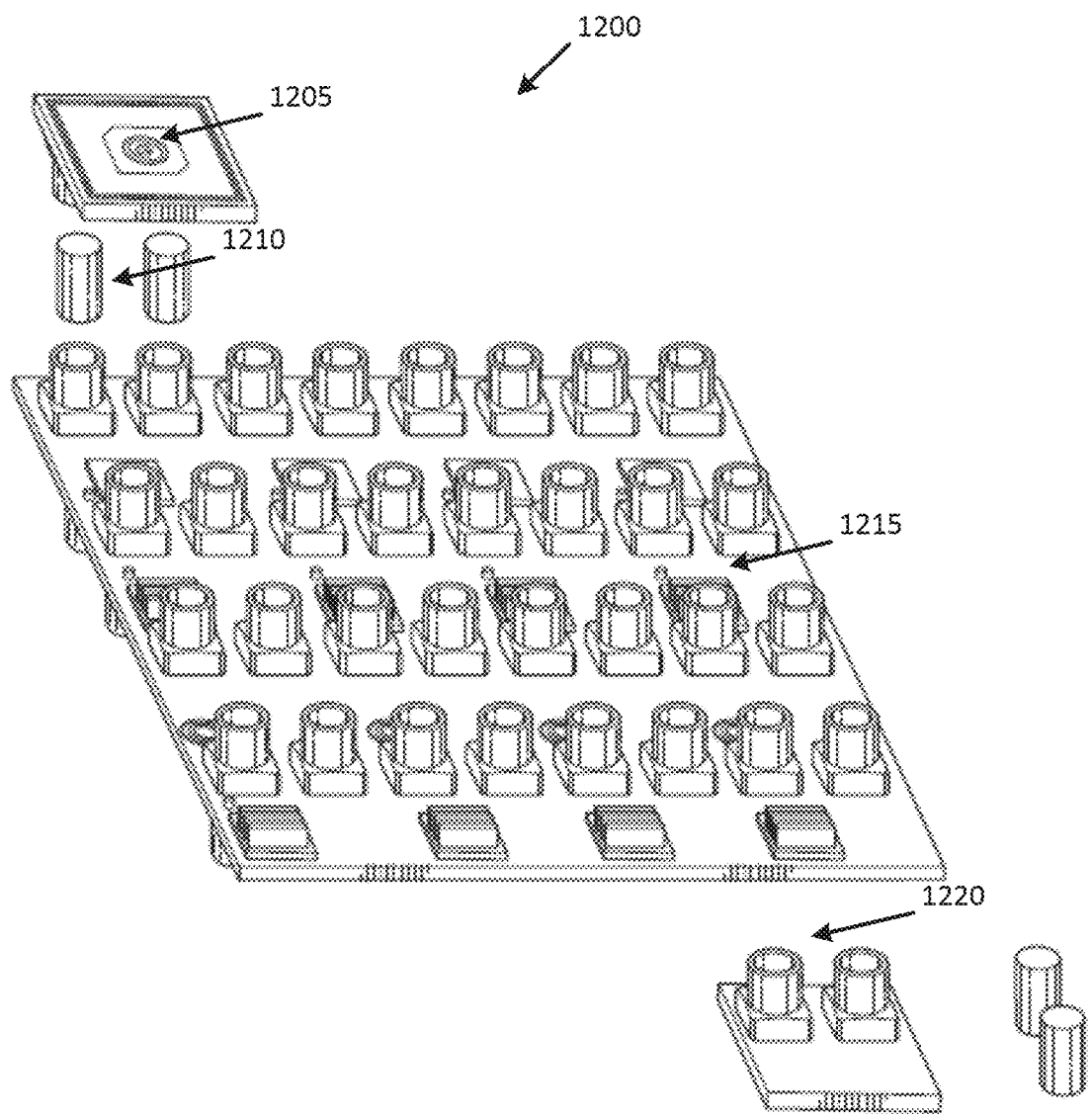
FIG. 12 illustrates several standard components and connectors used to assemble a beamscanning array system, according to some embodiments.

FIG. 12 illustrates several standard components and connectors used to assemble a beamscanning array system, according to some embodiments. As shown, components 1200 include an antenna element 1205, SMP connectors 1210, printed circuit board 1215 and connector 1220. Incidentally, the parts used to build a demonstration are believed to be attainable at minimal expense.

Figure 13A:
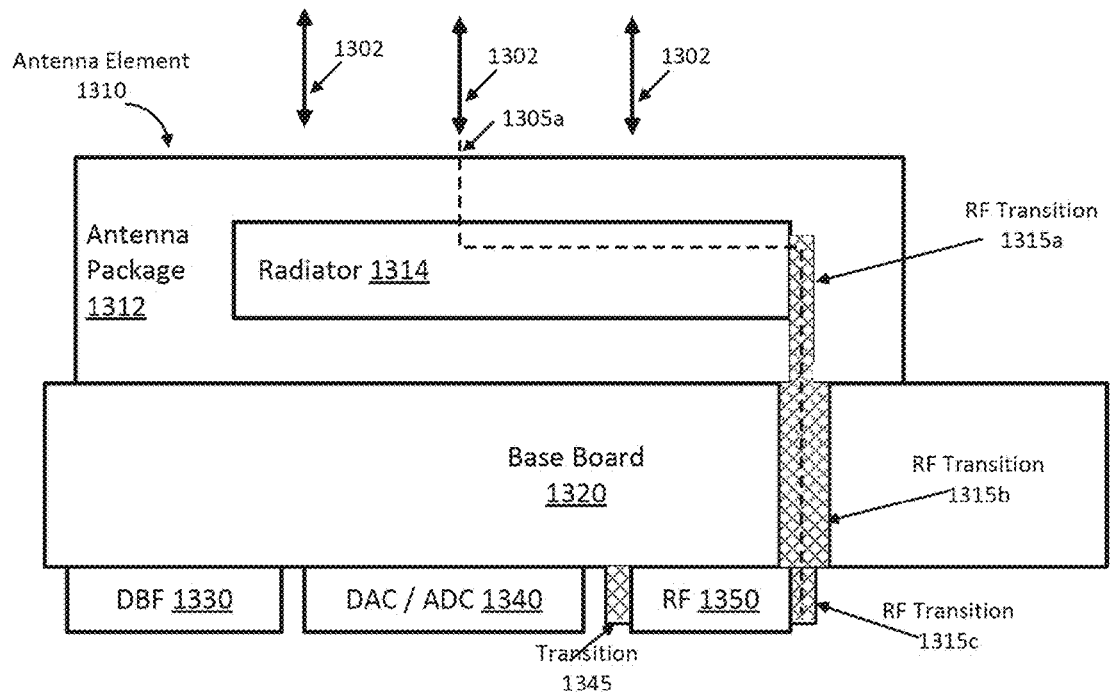
FIGS. 13A and 13B depict block diagrams illustrating an example antenna (or user terminal) element, according to some implementations.
Figure 13A:
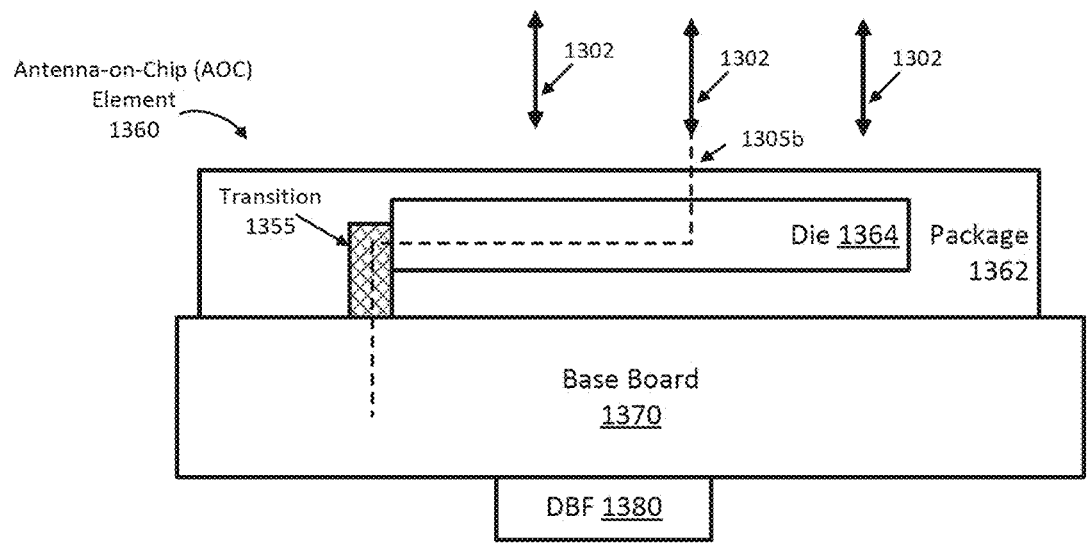
Figure 13B:
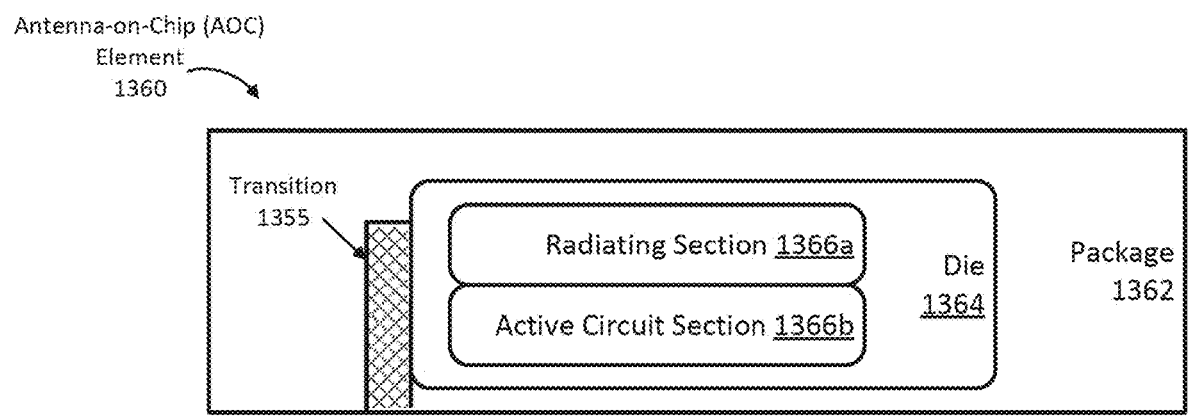

FIGS. 13A and 13B depict block diagrams illustrating an example antenna (or user terminal) element, according to some implementations. More specifically, the example of FIG. 13A illustrates the transition of an antenna element 1310 (e.g., for a phased array antenna system) to an AOC element 1360 whereby the radiator is embedded with the active circuitry in the die 1364. FIG. 13B then illustrates a more detailed view of AOC element 1360. As discussed herein, embedding, or otherwise combining the radiator with the active circuitry in the die 1364 of AOC element 1360 eliminates the lossy RF transitions that occur when coupling the radiator (or antenna) and the active circuitry in the antenna element 1310.

As shown in the example of FIG. 13A, the antenna element 1310 includes a radiator (or antenna) 1314 in antenna package 1312. Three lossy RF transitions 1315a-1315c couple the radiator (or antenna) 1314 to the RF (or active circuitry) circuitry 1350. Although not shown, the RF (or active circuitry) circuitry 1350 includes amplifiers and a phase shifter for each antenna element 1310. The amplifiers may be low noise amplifiers (LNAs) in the receiving direction RX or power amplifiers (PAs) in the transmitting direction TX. Transition 1345 couples the RF (or active circuitry) circuitry 1350 with base board 1320, e.g., for combining RF signals 1302 received by the antenna element 1310, or for phase shifting and amplification prior to transmitting the RF signals 1302.

Although not shown in the example of FIG. 13A, the base board 1320 can include many instances of antenna element 1310 assembled thereon. The RF (or active circuitry) circuitry 1350 can be embodied in one or more die, packaged individually, and assembled on the base board 1320. Additionally, digital-to-analog, and analog-to-digital (DAC/ADC) converters 1340 and digital beamforming (DBF) circuitry 1330 can be embodied in one or more die, packaged individually, and assembled on the base board 1320.

As discussed herein, the base board 1320 is a multi-layer base board, e.g., 10-40 layers. For satellite communication terminal applications, these layers can be multiple centimeters (cm) thick (e.g., 2-3 cm) and up to one meter (m) or more in length and/or width. The layers include the digital routing, RF power dividing, etc. Importantly, base board 1320 can be exceedingly expensive because of the need to be able to handle RF signals.

Additionally, the antenna designs are typically limited and inefficient. For example, there is limited space to implement the transitions in the base board as there are many crowded layers of routing. Furthermore, antennas cannot typically be built at scale with current designs. Indeed, the custom nature of the current phased-array antenna systems inherently requires custom antenna designs which increase expense and reduce the overall efficiency of the system.

Referring next to the antenna-on-chip (AOC) element, AOC element 1360 is shown embodied in AOC package 1362 and assembled on base board 1370. As shown in the example of FIG. 13A, AOC element 1360 includes die 1364 in AOC package 1362 with a transition 1355 that couples the die 1364 to the base board 1370. As noted above, because the radiator (or antenna) and the active circuitry are combined in the die 1364, there are no lossy RF transitions needed to couple these components. The AOC package 1362 is assembled on base board 1370.

FIG. 13B depicts a block diagram illustrating an exploded (or more detailed) view of AOC element 1360, according to some implementations. More specifically, as shown in the example of FIG. 13B, both a radiating section 1366a and an active circuit section 1366b are embodied or included in die 1364.

The radiating section 1366a includes a radiator (or antenna) which can be placed (e.g., deposited or positioned) in any number of configurations within die 1364. In some implementations, the radiating section 1366a can be deposited on one or more of the side and top walls of die 1364. The radiating section 1366a can be radiator 212 of FIG. 2, although alternative configurations are possible.

The active circuit section 1366b includes various components such as, for example, amplifiers, RF circuitry, digital-to-analog (D/A) converters, analog-to-digital (A/D) converters, etc. As discussed herein, the die 1364 is sufficiently larger in size (or footprint) than a traditional die (not shown). This larger die facilitates integration of various components that were previously not included within the active circuitry on a traditional die due to design and size limitations (e.g., RF circuitry, digital-to-analog (D/A) converters, analog-to-digital (A/D) converters, etc.). Furthermore, the ability to include D/A and A/D converters in the die 1364 facilitates digital integration into traditionally analog-only packages.

In some implementations, one or more slots in a ground plane (not shown) are used to couple the radiating section 1366a and the active circuit section 1366b within AOC element 1360. Alternatively, or additionally, the radiating section 1366a and the active circuit section 1366b can be coupled using one or more transmission line sections that are shared between various modules on the die 1364. It is appreciated that this type of coupling (e.g., coupling via shared transmission line sections) results in a negligible loss (e.g., 0.05 dB or less).

In some implementations, the radiating section 1366a and the active circuit section 1366b can be coupled via indirect radiation coupling.

Figure 14:
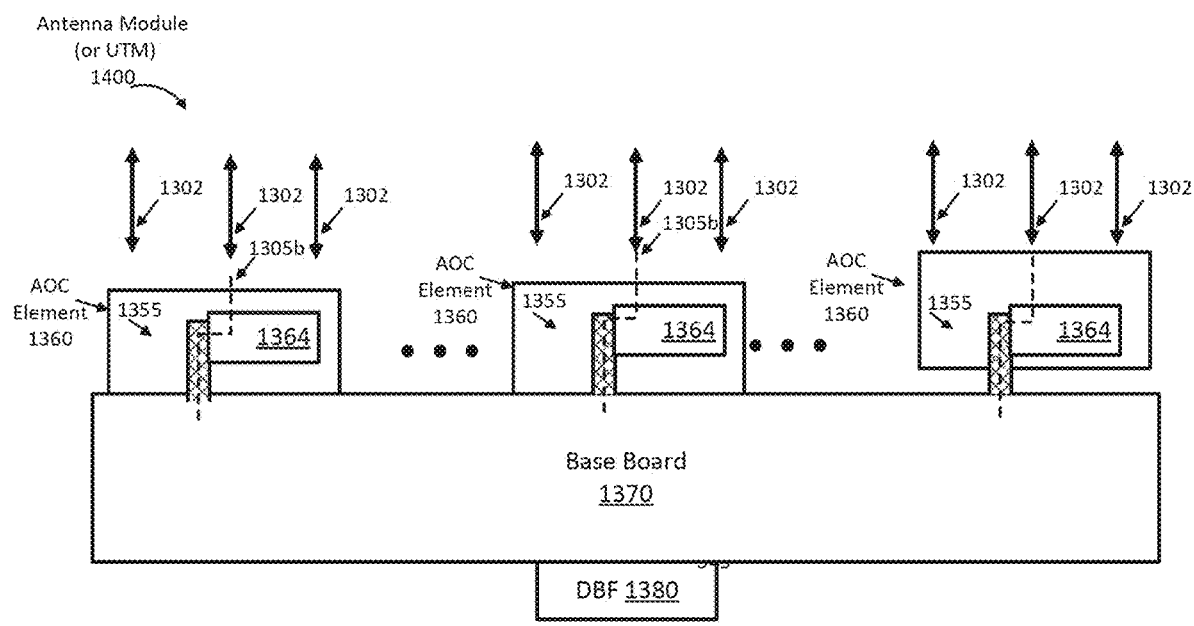
FIG. 14 depicts a block diagram illustrating an example antenna (or user terminal) module formed with multiple antenna (or user terminal) elements, according to some implementations.

FIG. 14 depicts a block diagram illustrating an example antenna (or user terminal) module 1400 formed with multiple instances of AOC element 1360 assembled on the first side of a base board 420, according to some implementations. More specifically, the example of FIG. 14 illustrates antenna (or user terminal) module 1400 formed with multiple instances of AOC element 1360 whereby the radiators are embedded with the active circuitry in the die 1364. As discussed herein, embedding, or otherwise combining the radiator with the active circuitry in the die 1364 of AOC element 1360 eliminates lossy RF transitions that typically occur when coupling the radiator and the active circuitry.

As shown in the example of FIG. 14, a digital beam forming (DBF) circuit, DBF circuit 1380, is embodied on a die and packaged. DBF circuit 1380 may include an ASIC which may be packaged as an IC. DBF circuit 1380 is assembled on an opposing side of base board 1370. A single instance of DBF circuit 1380 is shown. However, it is appreciated that more instances of DBF circuit 1380 can be assembled on the opposing side of the base board 1370 depending on the size or capability of the modular scanning antenna array system.

As discussed above, because the die 1364 is sufficiently larger in size than a traditional die, the AOC elements 1360 are able to integrate RF circuitry and D/A and A/D converters into the die 1364. As shown in the example of FIG. 14, integrating the RF circuitry and the D/A and A/D converters into the die or package reduces complexities of traditional base boards. For example, base board 1370 is no longer required to handle or route wide-band RF signals. Indeed, the base board 1370 is only required to handle either low-frequency digital signals or narrow band high frequency LO and clock signals. Advantageously, these changes drastically decrease the overall costs of the base board.

These improvements drastically decrease the overall costs of antenna (or user terminal) module 1400 as each AOC element 1360 can be built at high volume. Additionally, the base board 1370 has reduced function and is also less complex (e.g., no longer required to handle or route wide-band RF signals, and fewer/thinner layers) and much less expensive to manufacture than traditional base boards. Moreover, the fewer/thinner layers also result in a flatter and thinner antenna (or user terminal) module design.

Figure 15:
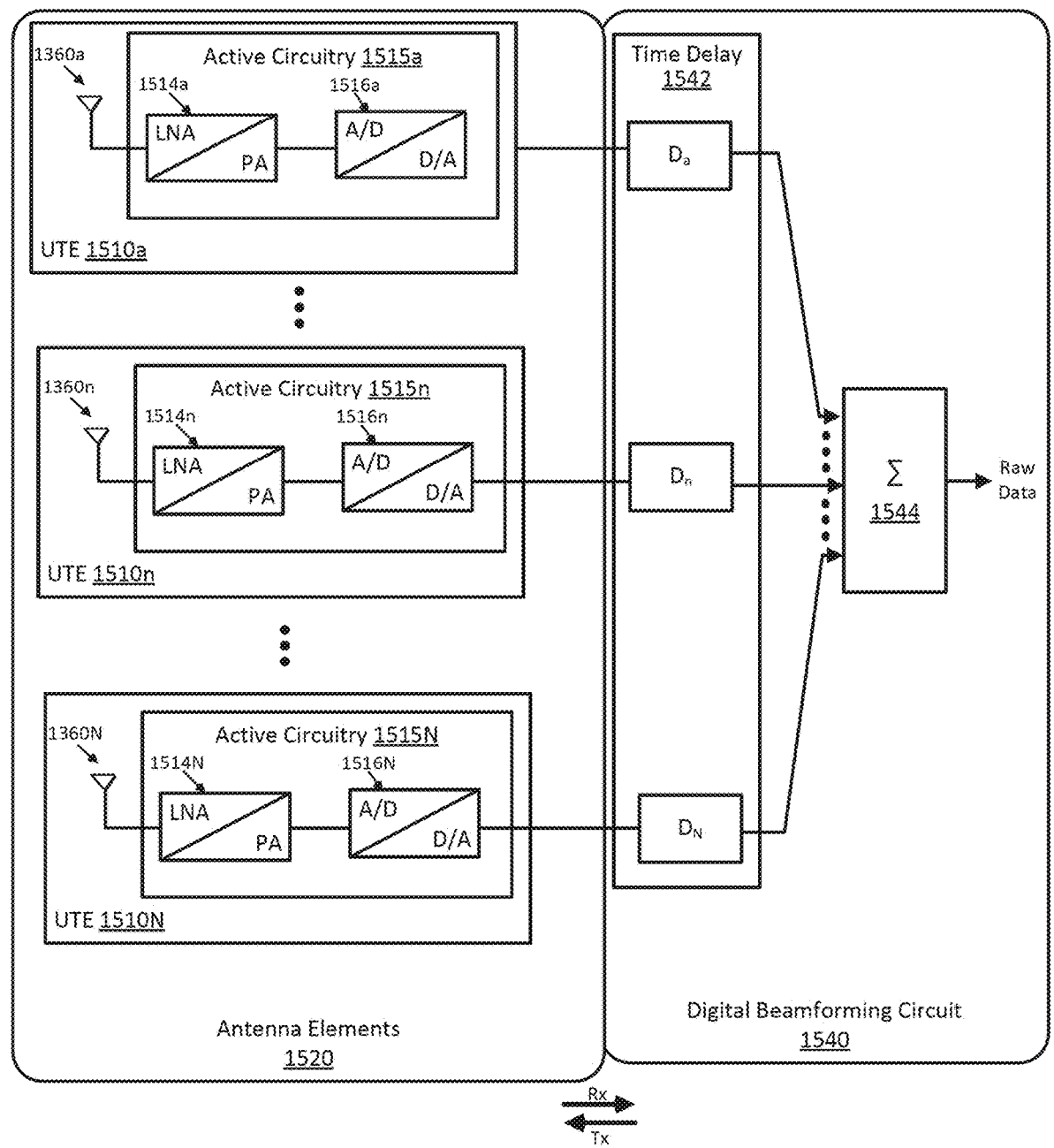
FIG. 15 depicts an example schematic of an electrical configuration for a high-performance modular digitally scanned array antenna system, according to some implementations.

FIG. 15 depicts an example schematic of an electrical configuration for a high-performance modular electronically scanned array antenna system, according to some implementations. More specifically, the example of FIG. 15 depicts an example multi-beam phased electronically scanned array antenna system in which multiple instances of AOC element 1360 are electrically coupled to DBF circuit 1540. Also shown are User Terminal Elements 1510A,N, LNA (Low Noise Amplifier)/PA (Power Amplifier) 1514a,n, as well as Analog-to-Digital and Digital-to-Analog Converters 1516 A,N, antenna elements 1520, and Combiner 1544.

As shown in the example of FIG. 15, DBF circuit 1540 uses time delays 1542 to perform beam steering as opposed to traditional phase shifters of phased-array antenna systems. An example illustrating beam steering on an antenna (or user terminal) panel is shown and discussed in greater detail with reference to FIG. 15.

Figure 16A:
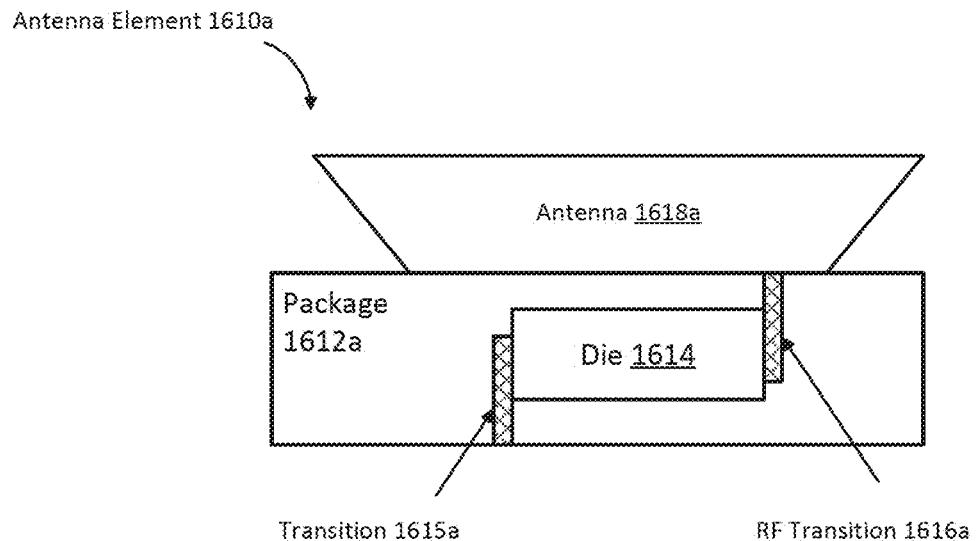
FIGS. 16A and 16B depict block diagrams illustrating example antenna elements having active circuitry embodied in a packaged die with 3D printed metal-only antennas, according to some implementations.
Figure 16B:
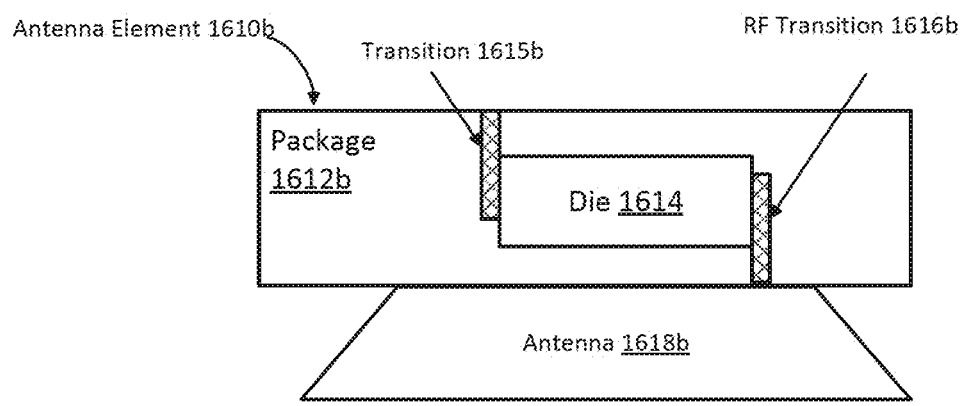

FIGS. 16A and 16B depict block diagrams illustrating examples of antenna element 1610a and antenna element 1610b with 3D printed metal-only antenna 1618a and 3D printed metal-only antenna 1618b, respectively, according to some implementations. More specifically, the examples of FIGS. 16A and 16B illustrate examples whereby the radiator (or antenna) and the active circuitry embodied in the die are closely integrated, but not on a single die (e.g., Silicon die), in order to reduce the lossy transitions 1615a and 1615b to a single lossy RF transition 1616a and 1616b, respectively.

Referring first to the example of FIG. 16A, antenna element 1610a illustrates an example whereby the 3D printed metal-only antenna 1618a is 3D printed directly on package 1612a. Indeed, as shown in the example of FIG. 16A, antenna element 1610a includes die 1614 in package 1612a. The 3D printed metal-only antenna 1618a is 3D printed directly on package 1612a and a single lossy RF transition 1616a couples the antenna to the active circuitry embodied in the die 1614.

The example of FIG. 16B is similar to the example of 16A but rather than 3D printing the 3D printed metal-only antenna 1618b directly on package 1612b, the 3D printed metal-only antenna 1618b is 3D printed and then package 1612b is assembled on the 3D printed metal-only antenna 1618b. For example, 3D printed metal-only antenna 1618b can be 3D printed stand-alone in a separate fixture and package 1612b then surface mounted on the 3D printed metal-only antenna 1618b.

As previously discussed, in addition to 3D printing, closely integrating the radiator (or antenna) and the active circuitry embodied in the die, but not on the same die, also facilitates use of tape and reel technology. "Tape and Reel" generally refers to a process of packing surface mount devices (SMD's) by loading them into individual pockets of a pocket (or carrier) tape. For example, the units are sealed in the carrier tape with a cover tape, usually by heat or pressure. The carrier tape can then wound around a reel for convenient handling and transport. The reel is enclosed in a reel box before it is finally shipped to the customer. As discussed herein, the ability to obtain components via tape and reel can reduce component costs increasing the ability to create and build antenna elements at scale for module beamscanning antenna array systems.

Figure 17:
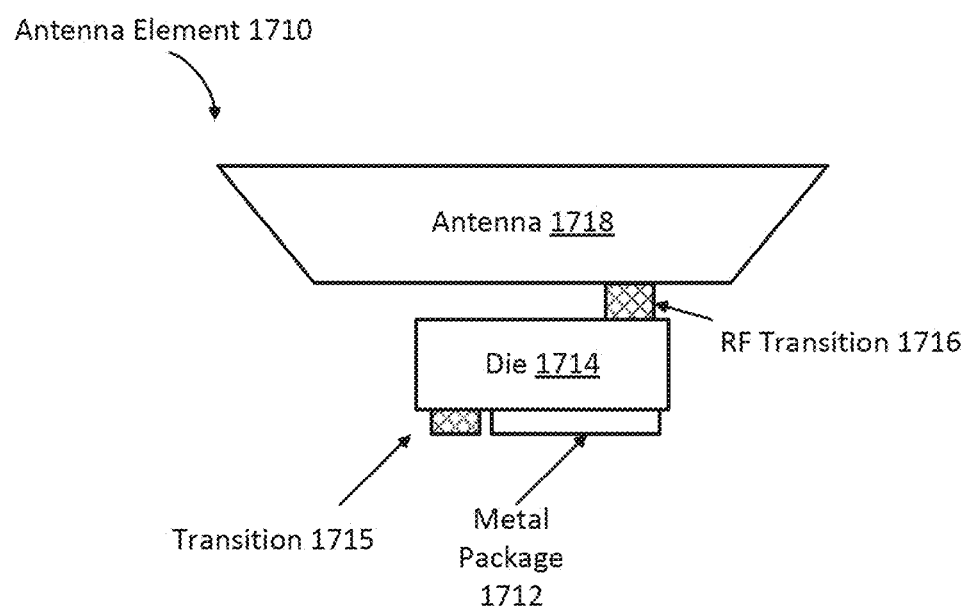
FIG. 17 depicts a block diagram illustrating an example antenna element with a metal package and 3D printed antennas, according to some implementations.

FIG. 17 depicts a block diagram illustrating an example of an antenna element 1710 with a metal-only package and 3D printed antennas, according to some implementations. More specifically, the example of FIG. 17 includes a single RF transition 1716 coupling the antenna 1718 to active circuitry embodied in die 1714. Advantageously, there are no RF transition losses occurring as a result of the single RF transition 1716 because the antenna element 1710 does not include a dielectric (e.g., transition 1715 to metal package 1712 is metal and the signal is routed only through metal).

Advantageously, the metal package 1712 is more thermally conductive, can handle more power, and exhibits more efficient thermal dissipation properties in comparison to any standard packaging. In other words, for example, heat that builds up during operation of die 1714 can be efficiently dissipated onto the metal package 1712 and the metal antenna 1718. In some implementations, the die 1714 can be packaged using 3D printing techniques. The metal package 1712 also provides flexibility in antenna designs resulting in the ability to design the most efficient antennas possible.

In some implementations, as the reels come, the manufacturing process prints the metal-only antennas on the die at high volume and speed using a 3D printing manufacturing process. The assembly pads (signal and ground) are then added to the opposite side of the die for eventual assembly on a base board or printed circuit board (PCB).

Figure 18:
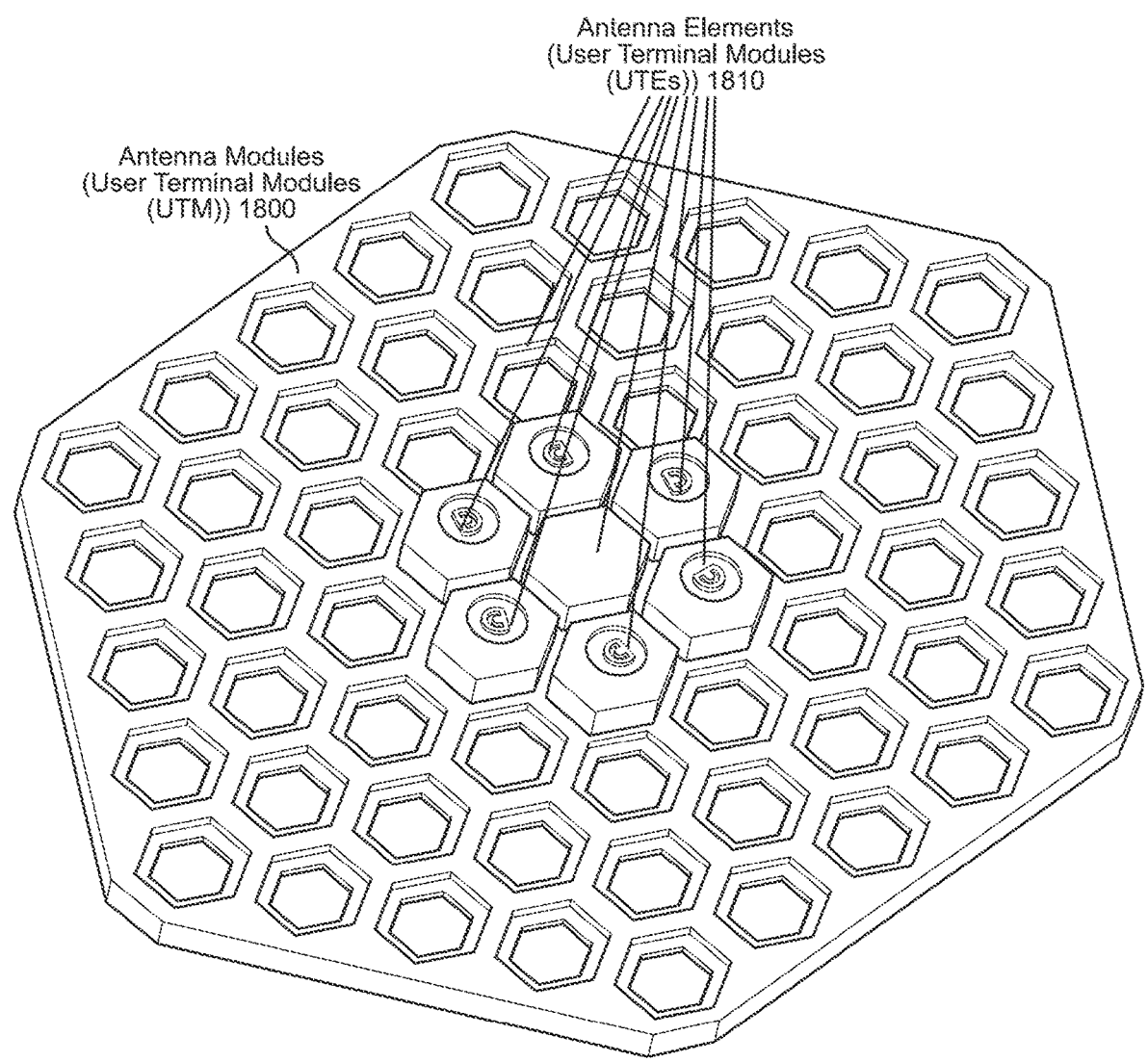
FIG. 18 depicts an example structure used to form an antenna (or user terminal) module, according to some implementations.

FIG. 18 depicts an example structure 1800 used to form an antenna (or user terminal) module, according to some implementations. More specifically, the example of FIG. 18 illustrates a structure populated with seven antenna (or user terminal) elements 1810. The example structure 1800 can be structure 320 of FIG. 3, although alternative configurations are possible. Although not shown in the example of FIG. 18, one or more of the example structures can be secured to a base board for constructing a high-performance scanned array antenna system.

Figure 19:
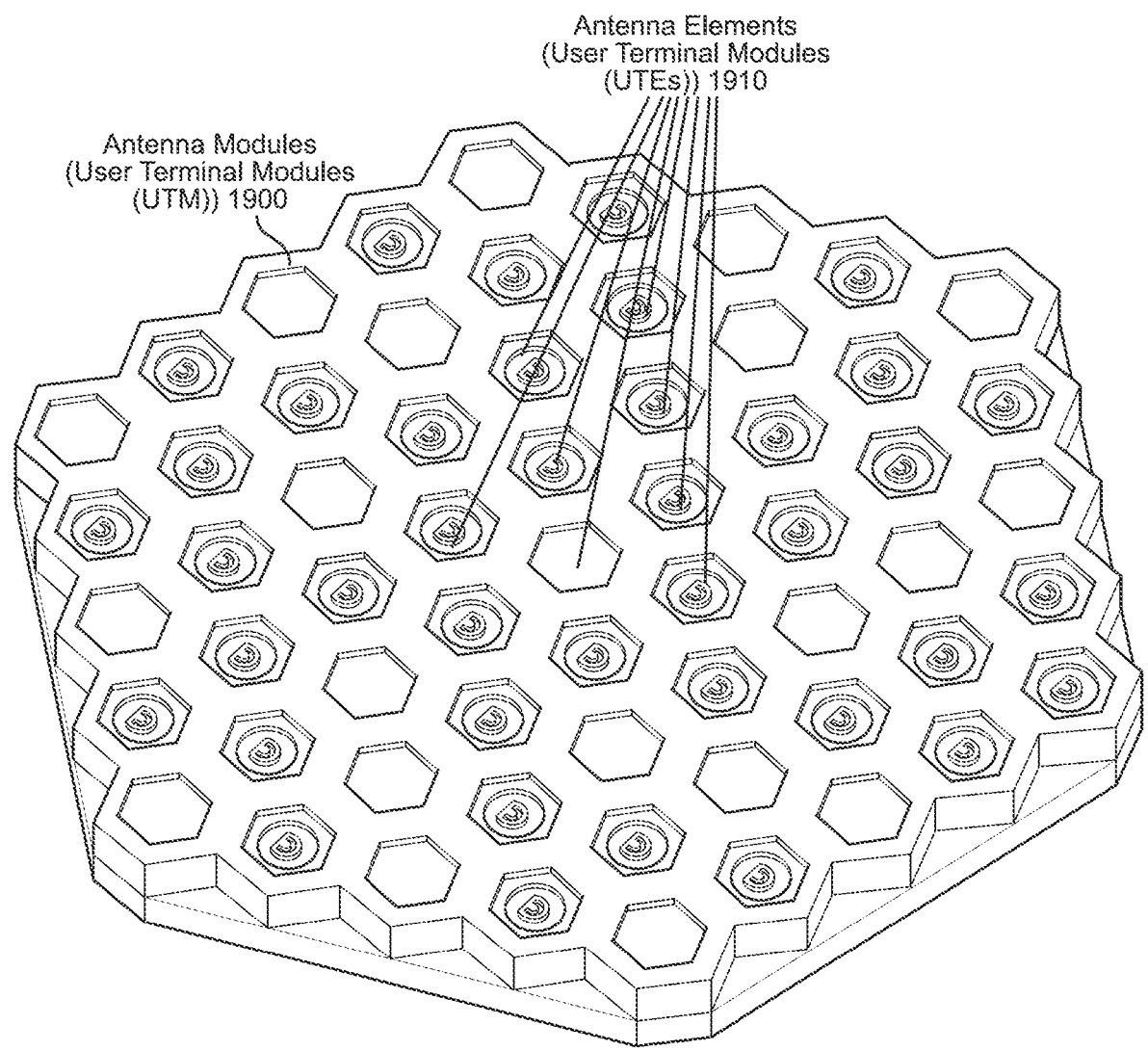
FIG. 19 depicts an example structure used to form an antenna (or user terminal) module, according to some implementations.

FIG. 19 depicts an example structure 1900 used to form an antenna (or user terminal) module, according to some implementations. The example structure 1900 is similar to example structure 1800 of FIG. 18 but is designed to more securely hold the antenna (or user terminal) elements 1918 in place. Additionally, as shown in the example of FIG. 19, example structure 1900 is fully populated with antenna (or user terminal) elements 1910.

Figure 20A:
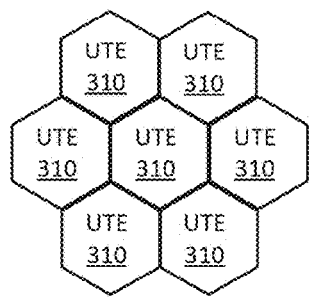
FIGS. 20A-20C depict example antenna (or user terminal) module configurations, according to some implementations.
Figure 20B:
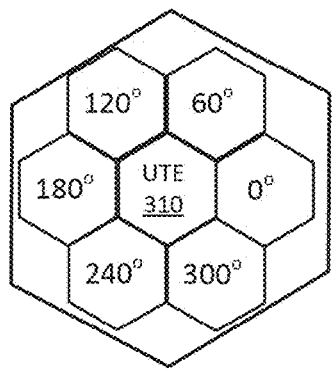
Figure 20C:
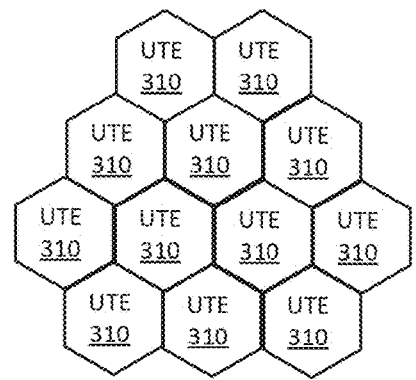

FIGS. 20A-20C depict example antenna (or user terminal) module configurations, according to some implementations. More specifically, the example of FIG. 20A illustrates a seventy-seven percent filling efficiency. That is, the non-UTE occupied area is equal to two hexagon shaped UTEs 310 and the UTE occupied area is filled with seven hexagon shaped UTEs.

FIG. 20B depicts an example self-repeating configuration with seven antenna (or user terminal) elements whereby each UTE 310 is sequentially rotated with respect to its neighboring UTEs in order to stagger the UTE phases and eliminate cross polarization.

FIG. 20C depicts another example self-repeating configuration with twelve elements with a seventy-five percent filling efficiency, such as that the non-UTE occupied area is equal to four hexagon shaped UTEs 310 and the UTE occupied area is filled with twelve hexagon shaped UTEs.

Figure 21A:
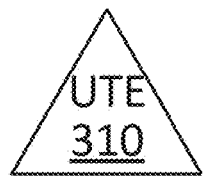
FIGS. 21A-21C depict example antenna (or user terminal) module configurations, according to some implementations.
Figure 21B:
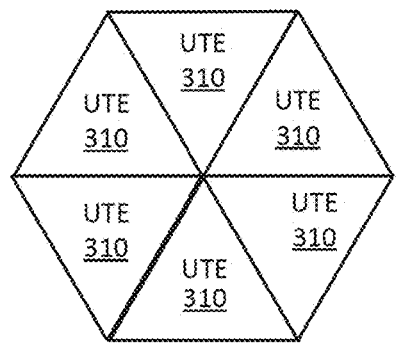
Figure 21C:
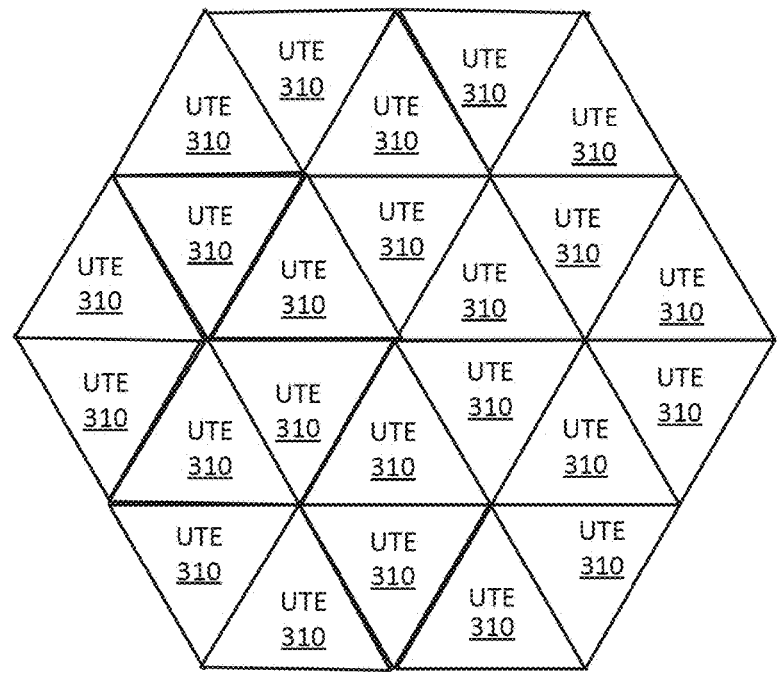

FIGS. 21A-21C depict additional example antenna (or user terminal) module configurations, according to some implementations. More specifically, the examples of FIGS. 21A-21C illustrate example antenna (or user terminal) module configurations that are formed from triangular shaped antenna (or user terminal) elements 310. FIG. 21A depicts a triangular shaped antenna (or user terminal) element. FIG. 21B depicts an example antenna (or user terminal) module configuration with six triangular shaped antenna (or user terminal) elements that has a one hundred percent filling efficiency. Similarly, FIG. 21C depicts an example antenna (or user terminal) module configuration with twenty-four triangular shaped antenna (or user terminal) elements that also has a one hundred percent filling efficiency.

Figure 22:
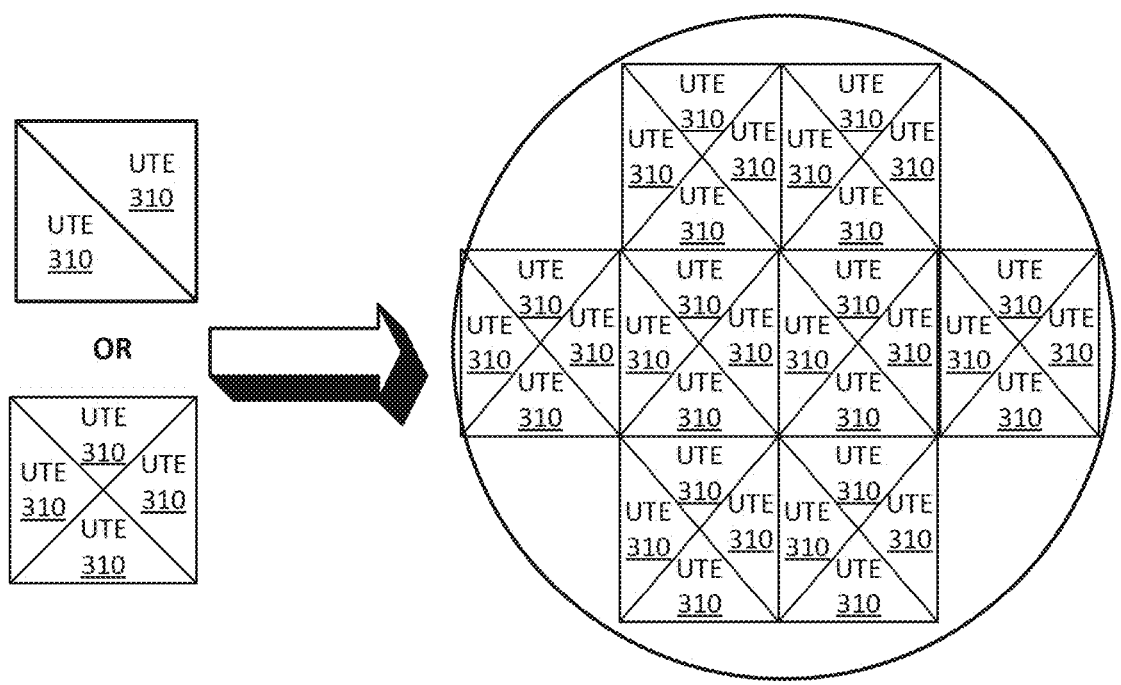
FIG. 22 depicts example antenna (or user terminal) module configurations, according to some implementations.

FIG. 22 depicts another example antenna (or user terminal) module configuration, according to some implementations. More specifically, the example of FIG. 22 illustrates example antenna (or user terminal) module configurations that are formed from right-angled triangular shaped antenna (or user terminal) elements 310. It should be noted that in some embodiments, two or more antenna configurations may be used to promote high packing efficiency on user terminal modules.

Figure 23:
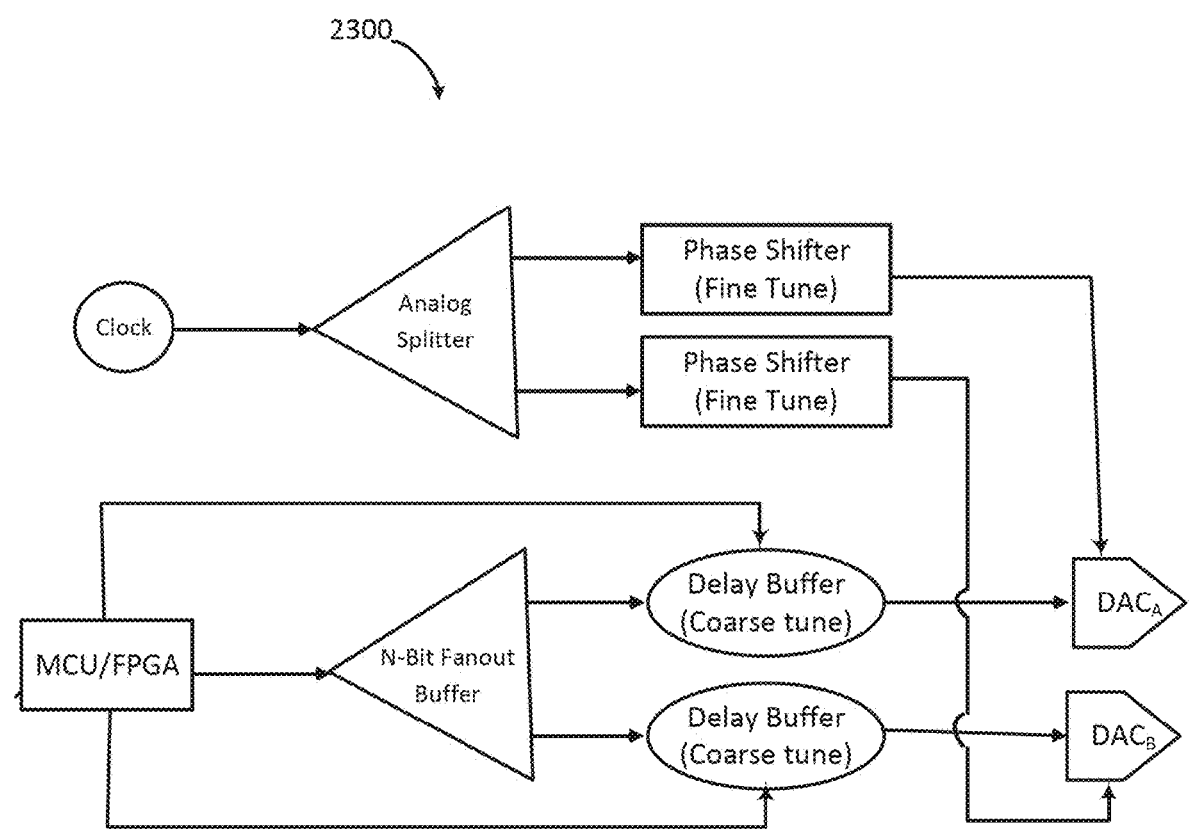
FIG. 23 depicts an example schematic of an electrical configuration illustrating a beam steering circuit for a high-performance modular electronically scanned array antenna system, according to some implementations.

FIG. 23 depicts an example schematic of an electrical configuration 2300 illustrating beam steering circuit for a high-performance and high-bandwidth modular electronically scanned array antenna system, according to some implementations. More specifically, the electrical configuration 2300 of FIG. 23 illustrates the transmitting side of a beam steering circuit for use on large panels or synthetic aperture use cases.

As discussed herein, electrical configuration 2300 is especially useful when using an under-sampled data converter where the analog signal to be generated or received may be found in one of several Nyquist bands.

In some implementations, e.g., when the clock sample rate may be lower than the analog frequency of interest, analog phase shifters on the clock may be used instead of analog phase shifters on the analog signal itself. This provides a fine tune phase control of the analog signal, regardless of the frequency that is being generated or received. In some implementations, e.g., when the phased array system is so large that some antenna elements must be delayed by more than one clock cycle, analog phase shifters on the clock cannot be utilized. Instead, as discussed herein, the digital data can be delayed by full cycles via a length-configurable FIFO. This delay can occur at the antenna element or module level and provides a coarse tune that can be used in conjunction with the fine tune clock phase steering. In this way, the elements' analog data can be shifted by any arbitrary phase well above 360 degrees with sub one-degree resolution. Such a capability may be advantageous for high-bandwidth and large-antenna-aperture situations.

Figure 24:
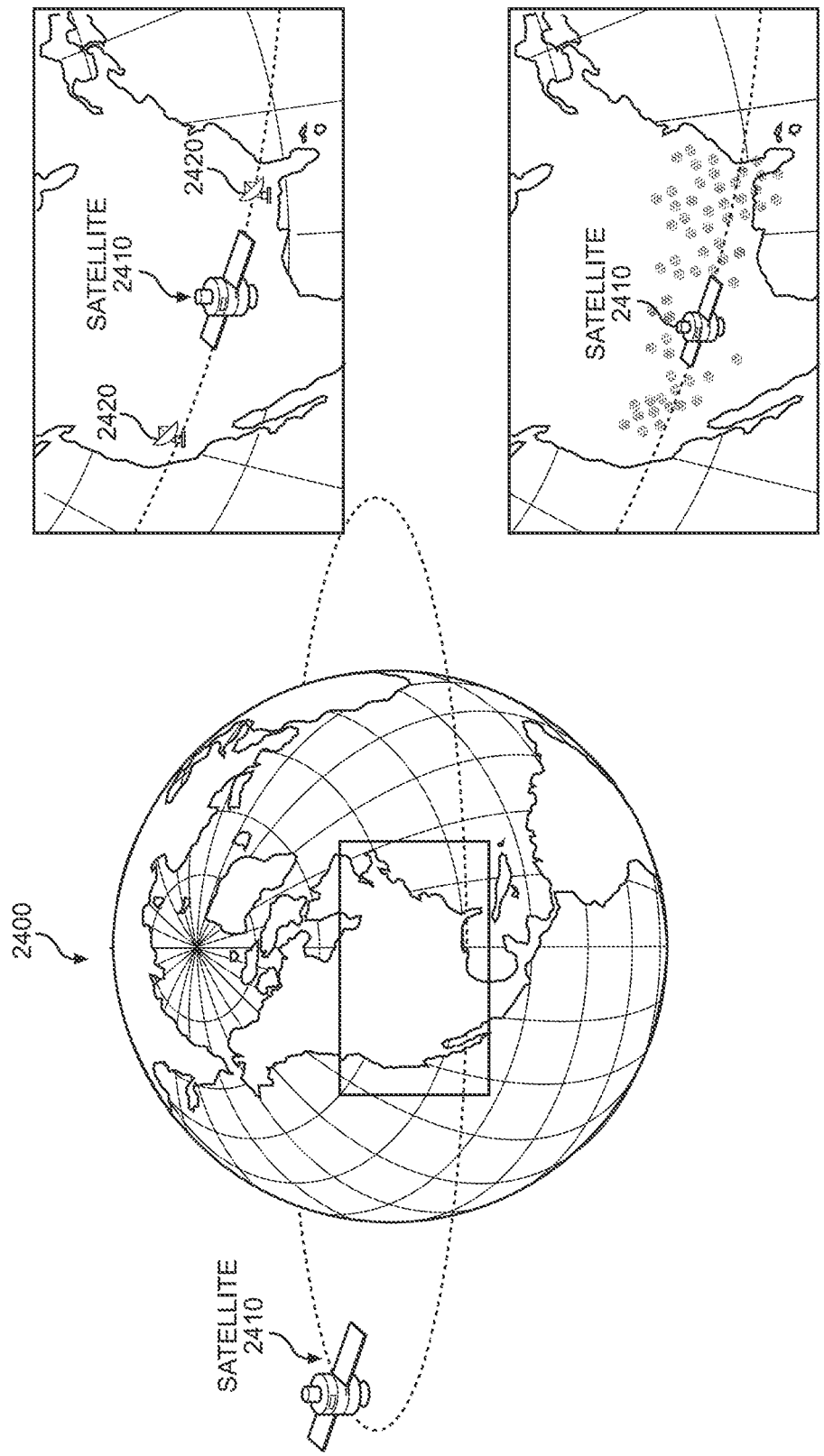
FIG. 24 depicts an example utilizing multiple ground user terminals constructed from modular satellite user terminal antenna systems to improve coverage and speed for real-time imaging applications, according to some implementations.

FIG. 24 depicts an example utilizing multiple ground user terminals constructed from modular satellite user terminal antenna systems to improve coverage and speed for real-time imaging applications, according to some implementations.

Today, imaging is primarily done through LEO constellations of satellites. However, the imaging coverage typically relies on how many satellites are included and the satellites need to wait for minutes to hours to cover different parts of the Earth. That is, satellite 2410 traverses a particular path over the Earth and needs to wait until communications can be established with a ground terminal 2420 (e.g., fixed-beam dish-based solution or gateway) before the capture image can be transmitted back to Earth. As discussed above, there are typically between one and five ground terminals 2420 along the particular path and therefore considerable latency exists in the imaging process.

As discussed herein, high quantities of low-cost, beam-forming, terminals can be utilized to replace the few, expensive, fixed-beam dish-based solutions to facilitate real-time or near real-time down of images.

Figure 25:
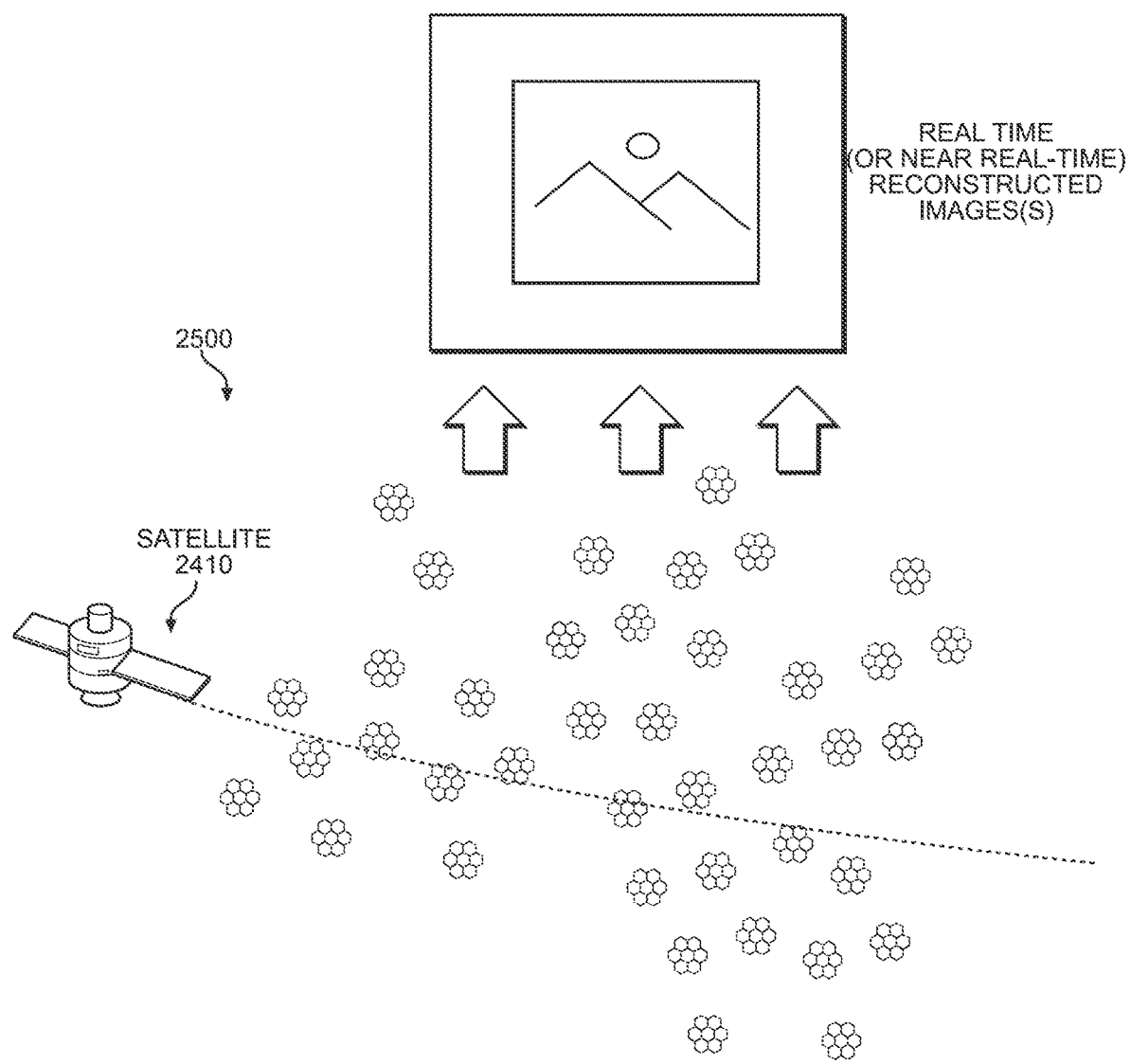
FIG. 25 depicts an example synthetic aperture ground user terminal constructed from multiple modular satellite user terminal antenna systems, according to some implementations.

FIG. 25 depicts an example synthetic aperture ground user terminal constructed from multiple modular satellite user terminal antenna systems, according to some implementations.

In order to obtain high-quality images, satellites need to have an extremely large antenna size. Satellites typically achieve this by performing synthetic aperture radar (SAR). For example, a small satellite captures images as it is moving and then reconsolidates the data as if it was a large aperture. The satellite then has a very large file and in order to receive it fast on the ground, an extremely large ground terminal (meters large) is needed. For example, large dishes that cost on the order of millions of dollars are often used for this purpose.

The example of FIG. 25 illustrates a synthetic aperture ground user terminal constructed from many user terminals, meters, or any arbitrary distance, apart that collectively receive and combine the data to effectively create a synthetically large ground terminal. Utilizing this architecture, gigabytes of data can be received in seconds and even live video streams of images taken by satellites are possible.

Alternatively, in some implementations, a single moving terminal (e.g., on a vehicle) can move around to create the synthetically large terminal.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A user terminal panel (UTP), the UTP comprising:
a first user terminal modules (UTMs), a plurality of secondary UTMs and a third UTM, each of the first UTM, the plurality of secondary UTMs and the third UTM comprising:
two or more user terminal elements (UTEs), each of the two or more UTEs comprising:
one or more antennas operable in a receiving mode or in a transmitting mode; and
one or more active circuits, the one or more active circuits configured to amplify and phase shift an analog signal received via the antenna, thereby generating a modified analog signal, the active circuit further configured to amplify and phase shift an analog signal transmitted via the antenna, wherein each of the one or more active circuits of the UTEs within each respective UTM are connected in series; and
a multi-level combiner circuit, the multi-level combiner circuit configured to combine the generated modified analog signal from each of the UTEs of the first UTM, the plurality of secondary UTMs and the third UTM into a one or more analog inputs or outputs; and
a controller configured to send a digital control signal for altering one or more properties of the analog signal of each of the one or more active circuits of the UTEs of the first UTM, the plurality of secondary UTMs and the third UTM;
wherein the controller is electronically coupled to the one or more active circuits of the UTEs of the first UTM, the one or more active circuits of the UTEs of the first UTM connected in series to the one or more active circuits of the UTEs of the plurality of secondary UTMs, and the one or more active circuits of the UTEs of the plurality of secondary UTMs connected in series to the one or more active circuits of the UTEs of the third UTM, the one or more active circuits of the UTEs of the third UTM electronically coupled to the controller; and
wherein each of the first UTM, the plurality of secondary UTMs and the third UTM has one or more buffers disposed between each of the UTM's active circuits, the buffers configured to correct degradation of a digital control signal passed from one active circuit to another active circuit.

2. The system of claim 1, wherein the UTMs collectively form an antenna system area, and wherein any number of UTMs can be adjusted such that the antenna system area can be adjusted to meet a predetermined throughput.

3. The system of claim 1, wherein the UTP is configured to emit an RF signal in a directional beam, and the controller is configured to send digital control signals to the first UTM, the plurality of secondary UTMs and the third UTM, altering the phase or amplitude of the analog signal processed by each UTE, thereby steering the directional beam.

4. The system of claim 1, wherein the UTEs of the first UTM, the plurality of secondary UTMs and the third UTM are configured to process analog signals in a target frequency range to match one or more frequency bands of a satellite.

5. The system of claim 1, wherein the UTEs of the first UTM, the plurality of secondary UTMs and the third UTM are configured to process signals of a similar polarization as to a target polarization for RF signals transmitted to or received from a satellite.

6. The system of claim 1, wherein the UTEs of the first UTM, the plurality of secondary UTMs and the third UTM are detachably coupled to the UTMs via sub-miniature push-on (SMP) connectors.

7. The system of claim 1, wherein the UTEs of the first UTM, the plurality of secondary UTMs and the third UTM may be configured in various shapes of a rectangle, triangle, or hexagon.

8. The system of claim 1, wherein the controller is further configured to receive a returned digital control signal from the third UTM, the returned digital control signal providing a status of the respective active circuits of the UTEs of the third UTM, the plurality of secondary UTMs and the first UTM.

9. The system of claim 1, wherein the one or more buffers are configured to correct for degradation of the digital control signals due to a change in a clock rate of the controller.

* * * * *